(12) United States Patent
Minami

(10) Patent No.: US 8,876,349 B2
(45) Date of Patent: Nov. 4, 2014

(54) DISPLAY AND ELECTRONIC UNIT

(75) Inventor: Masaru Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 13/446,251

(22) Filed: Apr. 13, 2012

(65) Prior Publication Data

US 2012/0275183 A1 Nov. 1, 2012

(30) Foreign Application Priority Data

Apr. 28, 2011 (JP) ................................. 2011-101947
Sep. 29, 2011 (JP) ................................. 2011-214868

(51) Int. Cl.
| | |
|---|---|
| *F21V 7/04* | (2006.01) |
| *F21V 8/00* | (2006.01) |
| *H04N 13/04* | (2006.01) |
| *G02B 27/22* | (2006.01) |

(52) U.S. Cl.
CPC .......... *G02B 27/2214* (2013.01); *G02B 6/0036* (2013.01); *G02B 6/0043* (2013.01); *G02B 6/0061* (2013.01); *H04N 13/0411* (2013.01); *H04N 13/0452* (2013.01)
USPC ......................................... 362/602; 362/97.1

(58) Field of Classification Search
CPC ............. G02B 6/0036; G02B 27/2214; G02B 6/0061; G02B 6/0043; H04N 13/0452; H04N 13/0411
USPC .............. 362/602, 619, 627, 97.1, 97.2, 97.3, 362/603, 326, 625, 618, 624, 608, 609, 362/558; 427/162; 349/62, 64, 15
See application file for complete search history.

(56) References Cited

U.S. PATENT DOCUMENTS

| | | | |
|---|---|---|---|
| 4,673,254 A | 6/1987 | Kato et al. | |
| 5,575,549 A | 11/1996 | Ishikawa et al. | |
| 5,897,184 A | 4/1999 | Eichenlaub et al. | |
| 5,956,107 A | 9/1999 | Hashimoto et al. | |
| 5,991,073 A | 11/1999 | Woodgate et al. | |
| 6,144,424 A | 11/2000 | Okuda et al. | |
| 6,447,132 B1 | 9/2002 | Harter, Jr. | |
| 7,356,211 B2 | 4/2008 | Sugiura et al. | |
| 7,507,011 B2 | 3/2009 | Ueno et al. | |

(Continued)

FOREIGN PATENT DOCUMENTS

| | | |
|---|---|---|
| JP | 62-029003 A | 2/1987 |
| JP | 01-241590 A | 9/1989 |

(Continued)

*Primary Examiner* — Nimeshkumar Patel
*Assistant Examiner* — Glenn Zimmerman
(74) *Attorney, Agent, or Firm* — Wolf, Greenfield & Sacks, P.C.

(57) ABSTRACT

A display includes: a display section including pixels, and grouping the pixels into pixel groups to assign, in a predetermined assignment pattern, perspective images to the groups, respectively, thereby displaying the perspective images; and a light source device including a light guide plate and one or more first light sources, and emitting light, the light guide plate having a first internal reflection face and a second internal reflection face and having one or more side faces, and the first light sources applying first illumination light into the light guide plate. One or both of the first and second internal reflection faces each have scattering regions arranged in a predetermined arrangement pattern corresponding to the predetermined assignment pattern, the scattering regions allowing the first illumination light from the first light source to be scattered and to exit to the outside of the light guide plate through the first internal reflection face.

9 Claims, 34 Drawing Sheets

(56) References Cited

U.S. PATENT DOCUMENTS

| | | |
|---|---|---|
| 7,525,531 B2 | 4/2009 | Ogiwara et al. |
| 7,876,397 B2 | 1/2011 | Krijn et al. |
| 7,920,226 B2 | 4/2011 | Mather et al. |
| 8,033,706 B1 | 10/2011 | Kelly et al. |
| 2008/0204550 A1 | 8/2008 | De Zwart et al. |
| 2010/0091354 A1 | 4/2010 | Nam et al. |
| 2010/0110340 A1 | 5/2010 | Mather et al. |
| 2010/0157200 A1 | 6/2010 | Mun et al. |
| 2011/0205448 A1 | 8/2011 | Takata |
| 2011/0242411 A1 | 10/2011 | Auer et al. |
| 2011/0242441 A1 | 10/2011 | Minami |
| 2012/0014136 A1 | 1/2012 | Lee et al. |
| 2012/0075698 A1 | 3/2012 | Minami |
| 2012/0105767 A1* | 5/2012 | Choi et al. .................. 349/62 |
| 2012/0195072 A1 | 8/2012 | Minami |
| 2012/0218490 A1* | 8/2012 | Takama et al. ................ 349/57 |
| 2012/0256974 A1 | 10/2012 | Minami |
| 2012/0257406 A1 | 10/2012 | Minami |
| 2013/0057537 A1* | 3/2013 | Hong et al. .................. 345/419 |
| 2013/0076999 A1 | 3/2013 | Minami |
| 2013/0083260 A1 | 4/2013 | Minami |
| 2013/0114292 A1 | 5/2013 | Brick et al. |

FOREIGN PATENT DOCUMENTS

| | | |
|---|---|---|
| JP | 03-011502 A | 1/1991 |
| JP | 10-097199 A | 4/1998 |
| JP | 10-508151 A | 4/1998 |
| JP | 3565391 B2 | 6/2004 |
| JP | 2004-240294 A | 8/2004 |
| JP | 2004-279815 A | 10/2004 |
| JP | 2007-507071 A | 3/2007 |
| JP | 2007-187823 A | 7/2007 |
| JP | 2007-242336 A | 9/2007 |
| JP | 2007-272994 A | 10/2007 |
| JP | 2007-279224 A | 10/2007 |
| JP | 2009-176593 A | 8/2009 |
| WO | WO 2010/024647 A2 | 3/2010 |

* cited by examiner

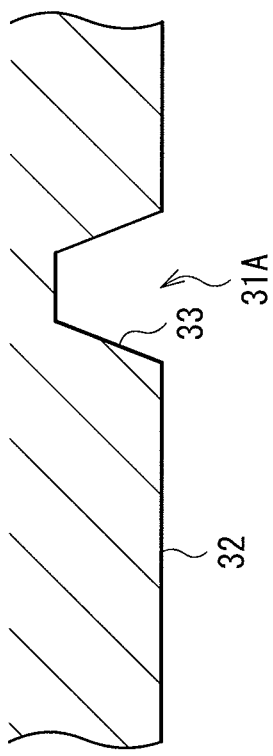
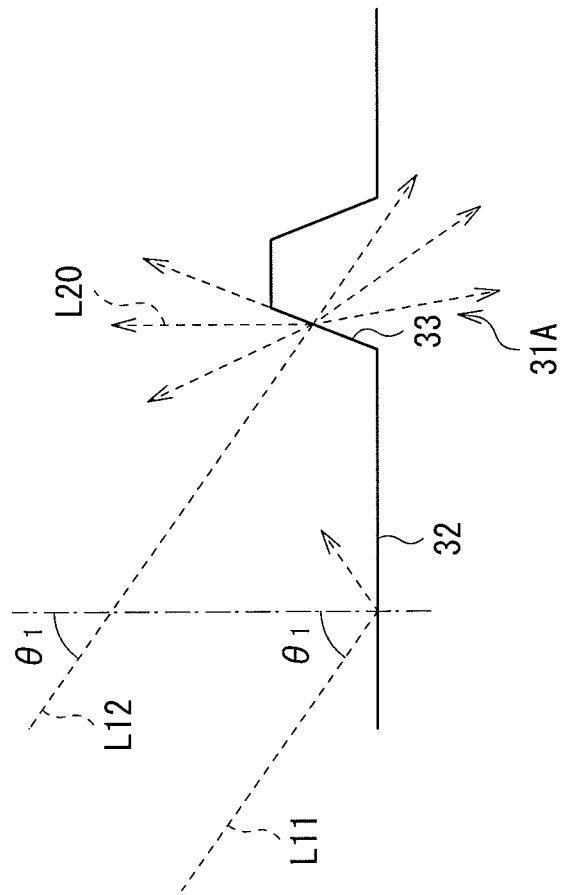
FIG. 6A
FIG. 6B

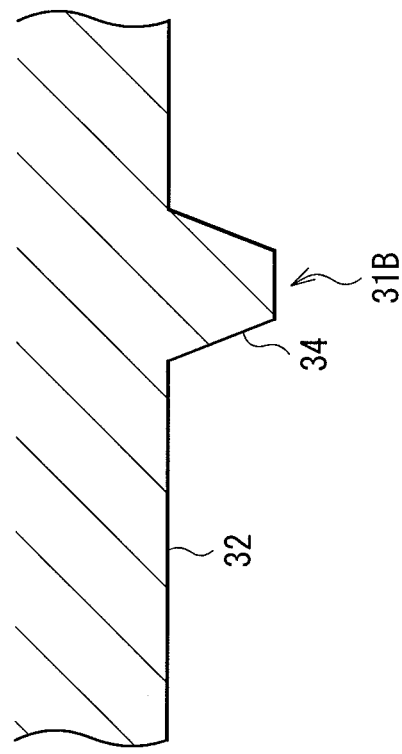
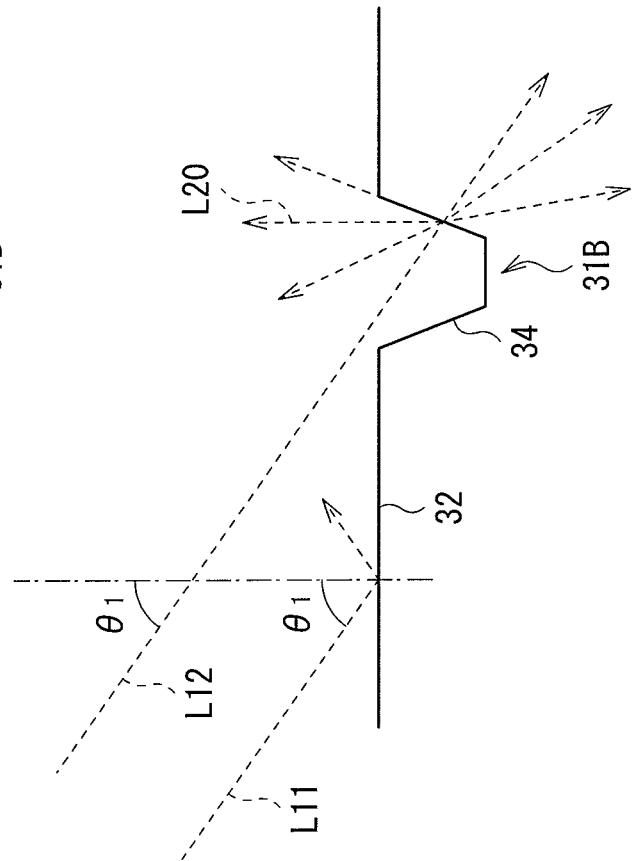
FIG. 7A
FIG. 7B

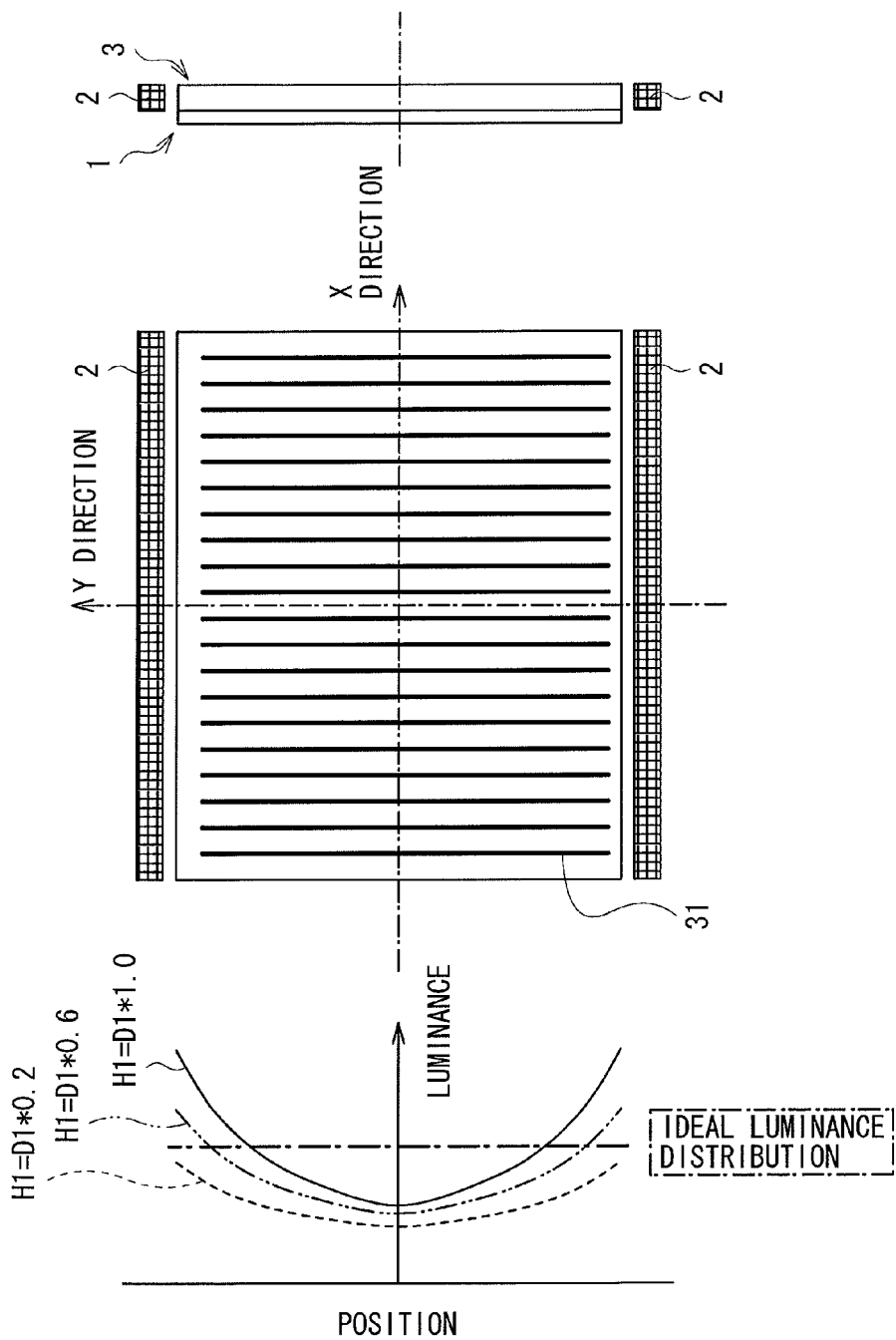

DISPLAY AND ELECTRONIC UNIT

BACKGROUND

The present disclosure relates to a display enabling stereoscopic display of a parallax barrier type, and an electronic unit including the display.

A stereoscopic display of a parallax barrier type is one of typical stereoscopic display systems enabling stereoscopic display with naked eyes instead of special spectacles. The stereoscopic display includes a parallax barrier oppositely disposed on the front (close to a display surface) of a two-dimensional display panel. The parallax barrier typically has a structure where light-shielding portions shielding display image light from the two-dimensional display panel and stripe-shaped openings (slit portions) transmitting the display image light are alternately provided in a horizontal direction.

In the parallax barrier type, parallax images for stereoscopy (in the case of two eyepoints, a right perspective image and a left perspective image) are displayed on the two-dimensional display panel in a space-divisional manner, and the parallax images are parallactically separated, in a horizontal direction, by the parallax barrier for stereoscopy. For example, the width of each slit of the parallax barrier is appropriately set. This enables light rays of different parallax images to be separately incident on two eyes of a viewer through the slit portions in viewing of the stereoscopic display from a predetermined position and a predetermined direction by the viewer.

It is to be noted that in the case where, for example, a transmissive liquid crystal display panel is used as the two-dimensional display panel, the parallax barrier is allowed to be disposed close to the back of the two-dimensional display panel (see FIG. 10 of Japanese Patent No. 3565391 and FIG. 3 of Japanese Unexamined Patent Application Publication No. 2007-187823). In such a case, the parallax barrier is disposed between the transmissive liquid crystal display panel and a backlight.

SUMMARY

Unfortunately, the stereoscopic display of a parallax barrier type inevitably includes a special component for three-dimensional display, or the parallax barrier, leading to a large number of components and a wide layout space compared with typical displays for two-dimensional display.

It is desirable to provide a display including a light guide plate enabling a function equivalent to the parallax barrier, and an electronic unit including the display.

According to an embodiment of the disclosure, there is provided a display including a display section including a plurality of pixels, and grouping the plurality of pixels into a plurality of pixel groups to assign, in a predetermined assignment pattern, a plurality of perspective images to the groups, respectively, thereby displaying the perspective images; and a light source device including a light guide plate and one or more first light sources, and emitting light for image display toward the display section, the light guide plate having a first internal reflection face and a second internal reflection face which face each other and having one or more side faces, and the first light sources applying first illumination light through the side face of the light guide plate into the light guide plate, wherein one or both of the first and second internal reflection faces each have a plurality of scattering regions arranged in a predetermined arrangement pattern corresponding to the predetermined assignment pattern, the scattering regions allowing the first illumination light from the first light source to be scattered and to exit to the outside of the light guide plate through the first internal reflection face.

According to another embodiment of the disclosure, there is provided a display including a display section including a plurality of pixels; and a light source device including a light guide plate and a light source, and emitting light to the display section, wherein the display section groups the plurality of pixels into a plurality of pixel groups and assigns, in a predetermined assignment pattern, a plurality of perspective images to the groups, respectively, thereby to display the perspective images, and the light guide plate has a plurality of scattering regions arranged in a predetermined arrangement pattern corresponding to the predetermined assignment pattern, the scattering regions allowing the light from the light source to be scattered and to exit to the outside of the light guide plate.

According to still another embodiment of the disclosure, there is provided an electronic unit including a display, the display including a display section including a plurality of pixels, and grouping the plurality of pixels into a plurality of pixel groups to assign, in a predetermined assignment pattern, a plurality of perspective images to the groups, respectively, thereby displaying the perspective images; and a light source device including a light guide plate and one or more first light sources, and emitting light for image display toward the display section, the light guide plate having a first internal reflection face and a second internal reflection face which face each other and having one or more side faces, and the first light sources applying first illumination light through the side face of the light guide plate into the light guide plate, wherein one or both of the first and second internal reflection faces each have a plurality of scattering regions arranged in a predetermined arrangement pattern corresponding to the predetermined assignment pattern, the scattering regions allowing the first illumination light from the first light source to be scattered and to exit to the outside of the light guide plate through the first internal reflection face.

In the display or the electronic unit according to the embodiments of the disclosure, the first illumination light from the first light source is scattered by the scattering regions, and part or all of the scattered light is output to the outside of the light guide plate through the first internal reflection face. This enables the light guide plate itself to function as the parallax barrier. Specifically, the light guide plate equivalently functions as the parallax barrier with the scattering regions as the openings (slit portions).

According to the display or the electronic unit according to the embodiments of the disclosure, scattering regions are provided on the first or second internal reflection face of the light guide plate, and thus the light guide plate itself is allowed to equivalently function as the parallax barrier. In addition, the plurality of scattering regions is arranged in the predetermined pattern corresponding to the predetermined assignment pattern, leading to excellent separation of the plurality of perspective images.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 6A is a sectional view illustrating a first exemplary configuration of a surface of a light guide plate of the display shown in FIG. 1, and FIG. 6B is an explanatory view schematically illustrating light rays scatter-reflected on the surface of the light guide plate shown in FIG. 6A.

FIG. 7A is a sectional view illustrating a second exemplary configuration of the surface of the light guide plate of the display shown in FIG. 1, and FIG. 7B is an explanatory view schematically illustrating light rays scatter-reflected on the surface of the light guide plate shown in FIG. 7A.

Figure 9:
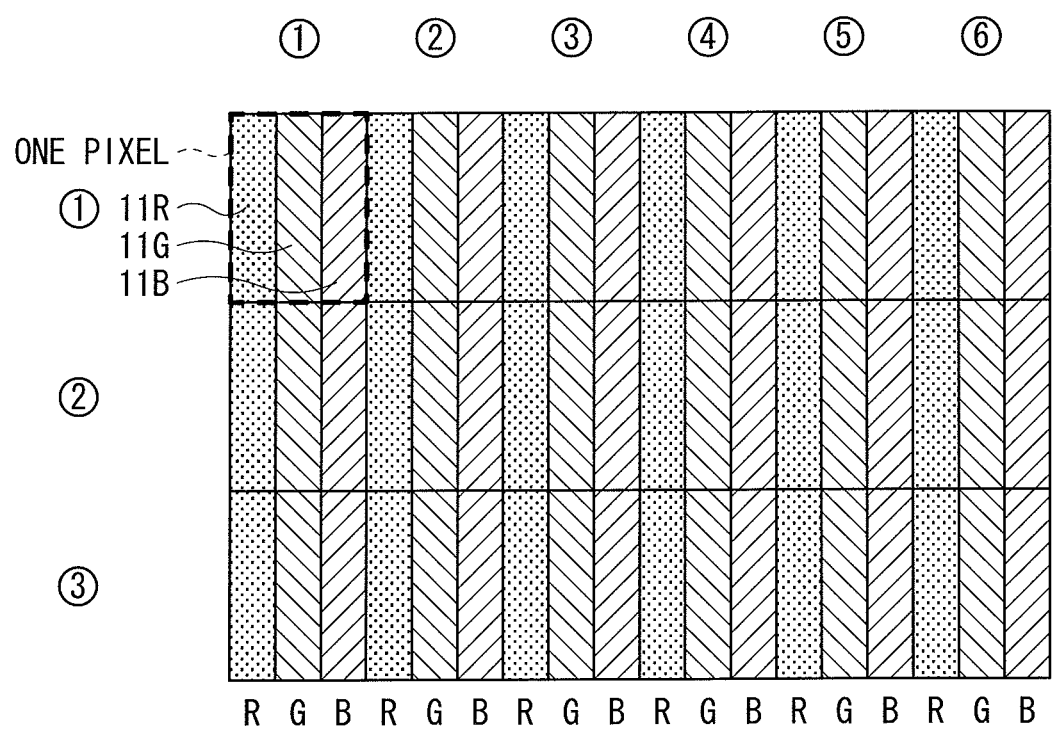
FIG. 9 is a plan view illustrating a first example of a pixel structure of a display section.
Figure 10:
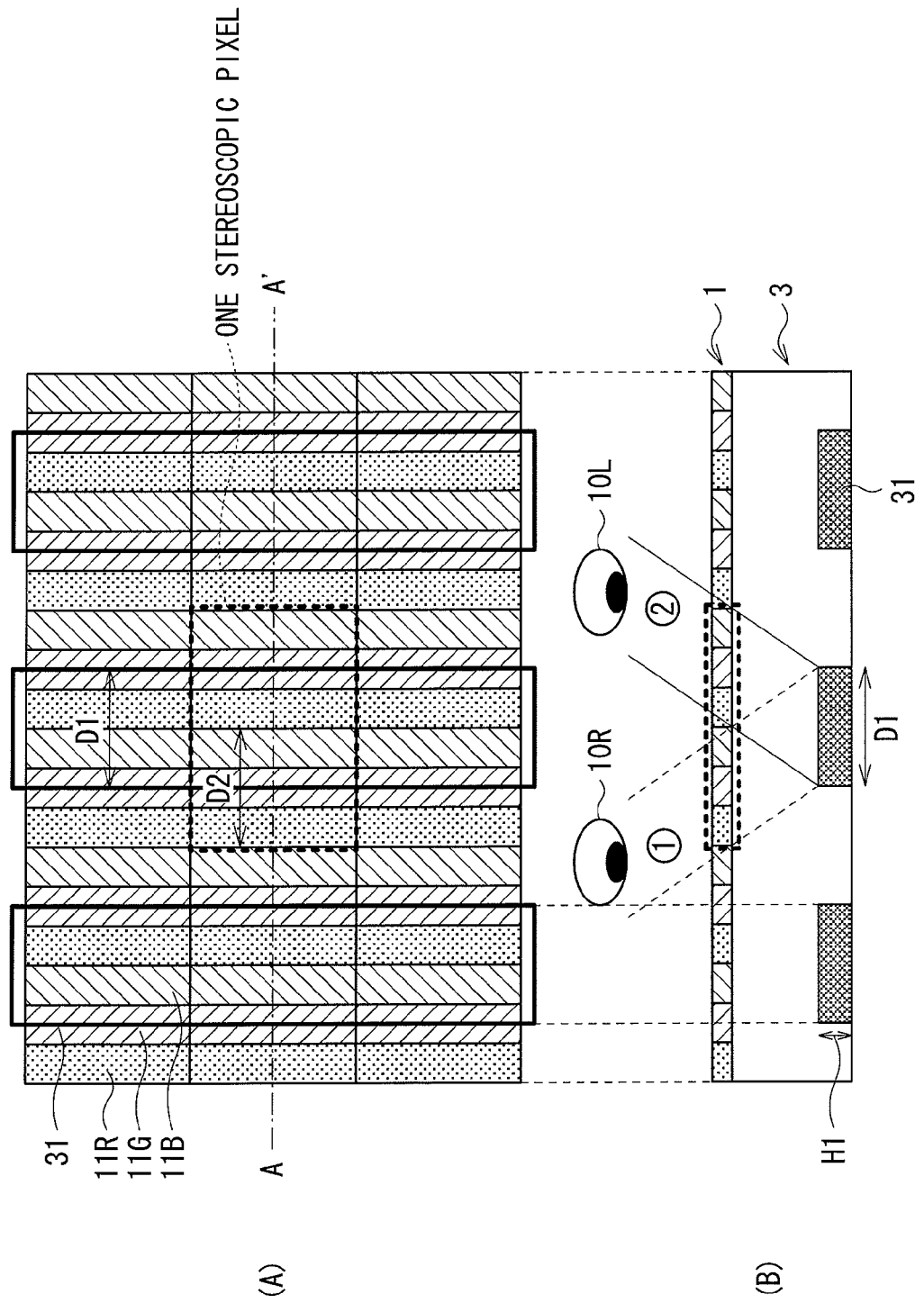

(A) of FIG. 10 is a plan view illustrating an exemplary correspondence relationship between an assignment pattern in assignment of two perspective images and an arrangement pattern of the scattering regions in the pixel structure shown in FIG. 9, and (B) of FIG. 10 is a sectional view illustrating the correspondence relationship.

Figure 11:
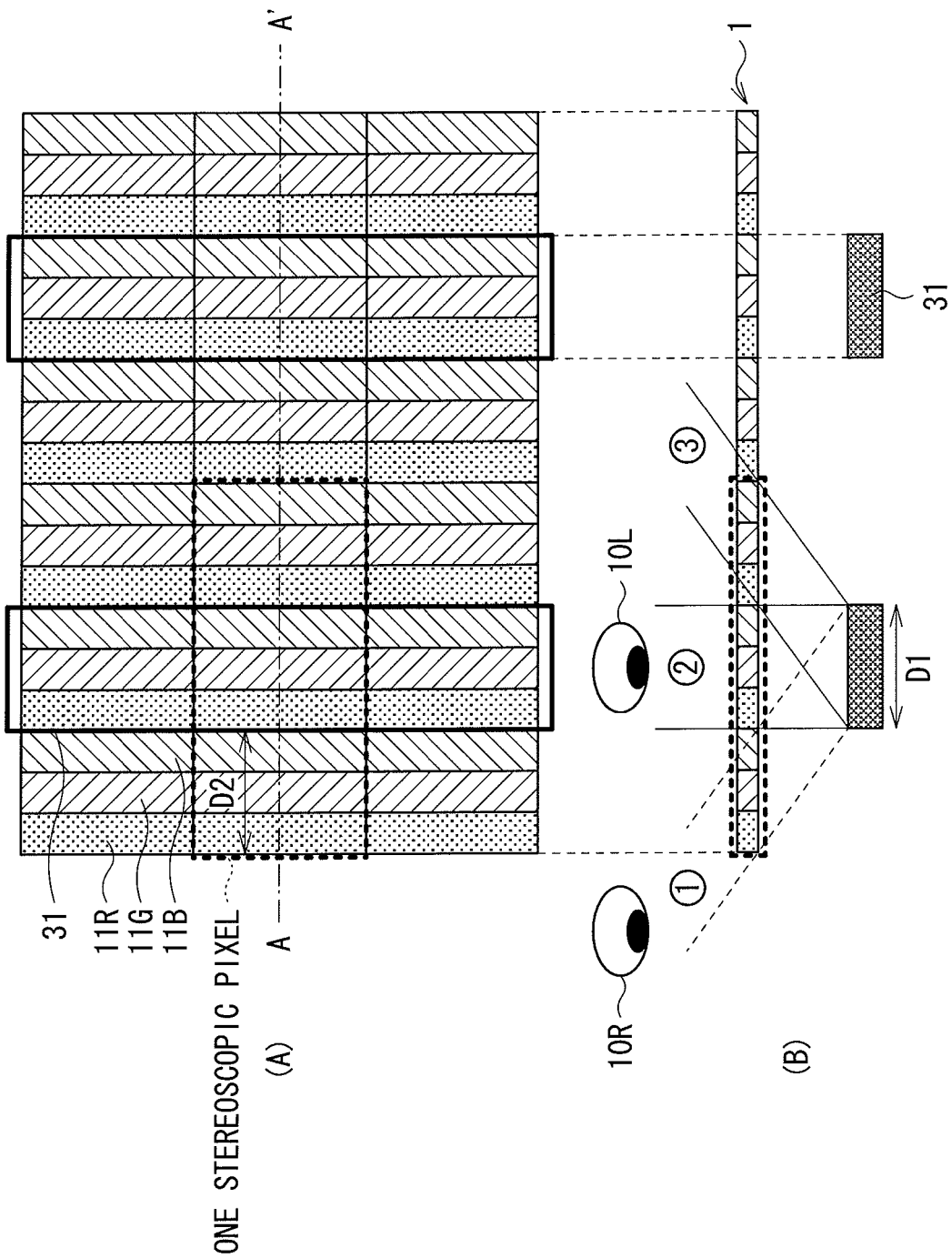

(A) of FIG. 11 is a plan view illustrating a first example of a correspondence relationship between an assignment pattern in assignment of three perspective images and an arrangement pattern of scattering regions in the pixel structure shown in FIG. 9, and (B) of FIG. 11 is a sectional view illustrating the correspondence relationship.

Figure 12:
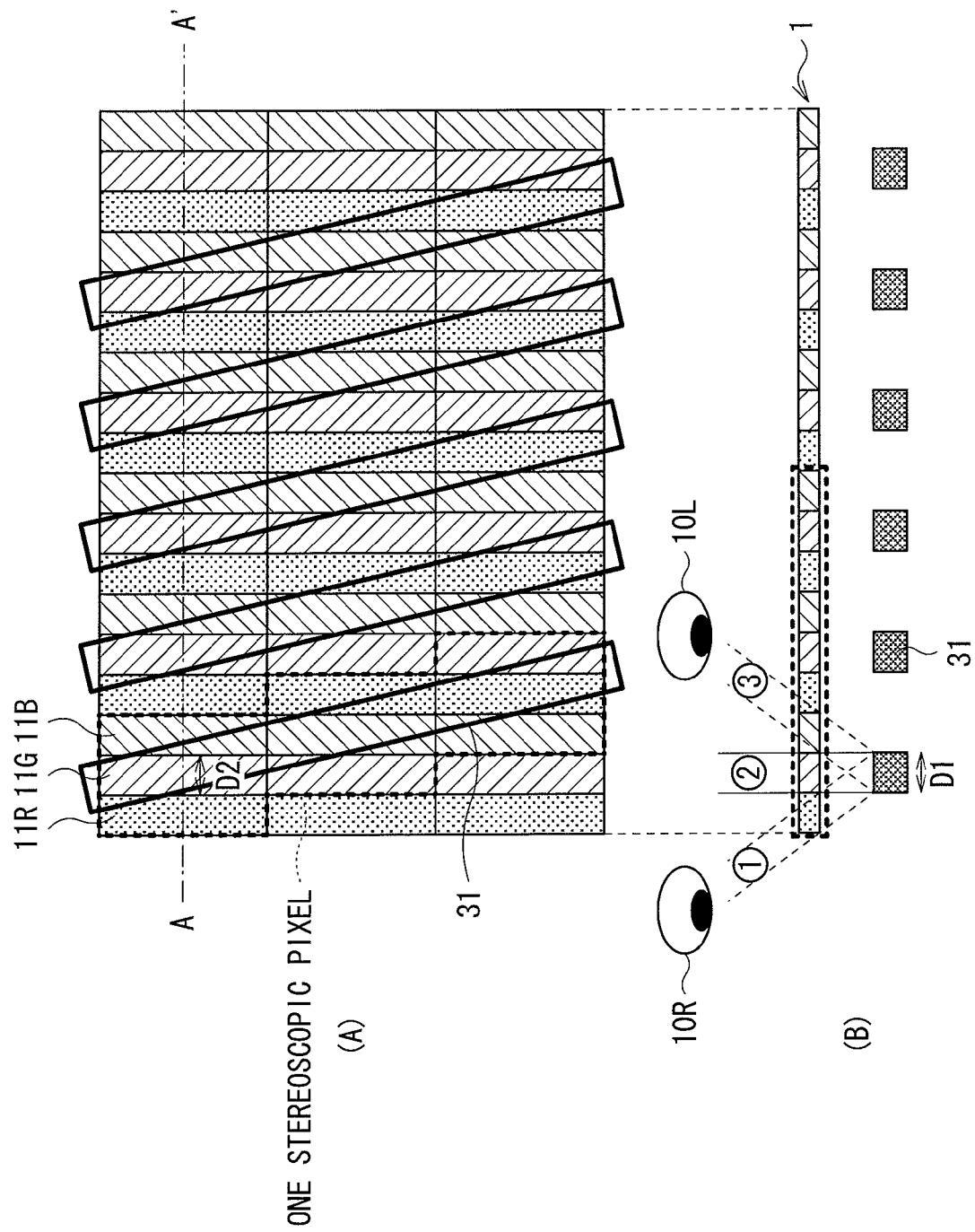

(A) of FIG. 12 is a plan view illustrating a second example of the correspondence relationship between the assignment pattern in assignment of three perspective images and the arrangement pattern of scattering regions in the pixel structure shown in FIG. 9, and (B) of FIG. 12 is a sectional view illustrating the correspondence relationship.

Figure 13:
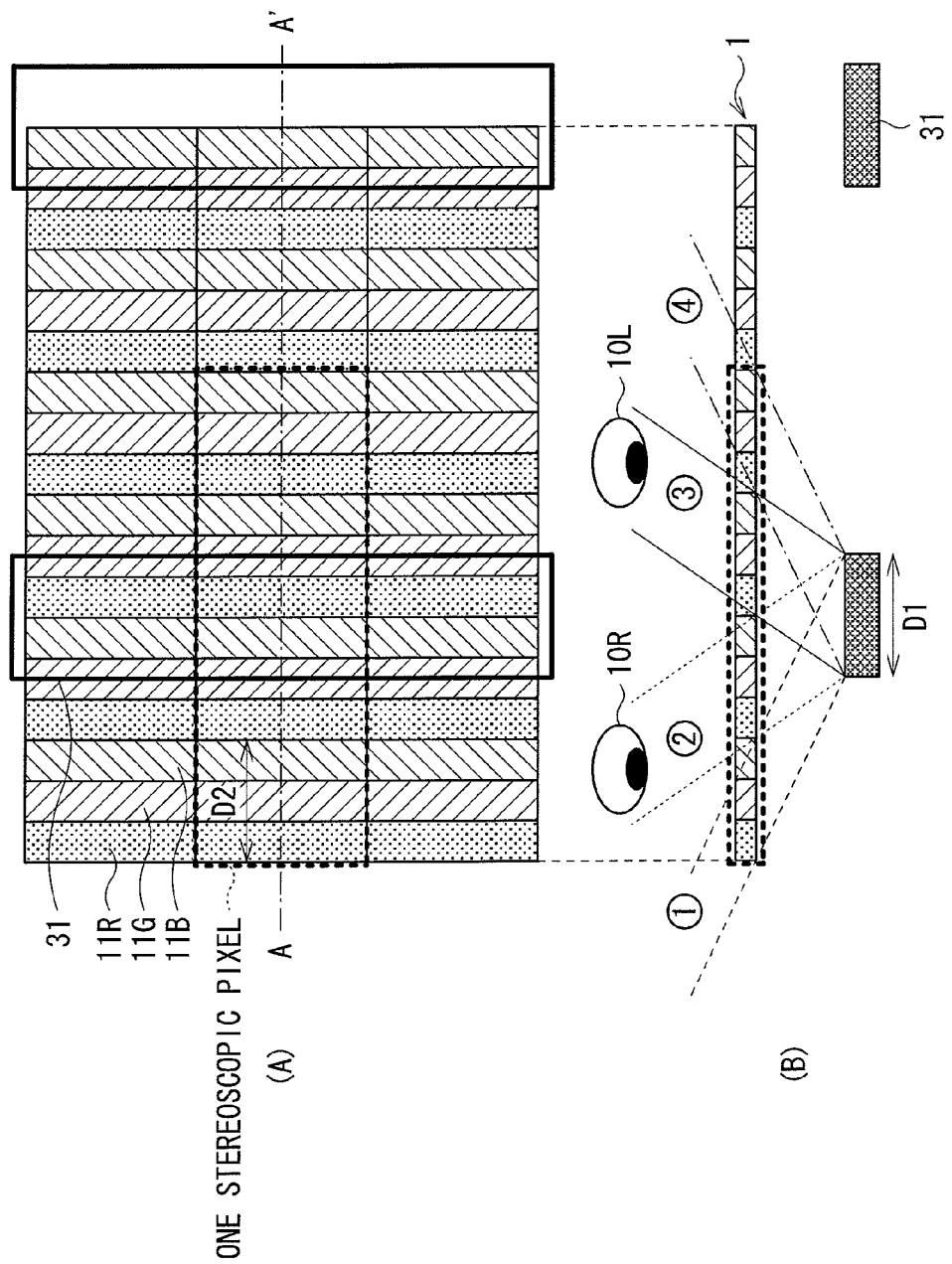

(A) of FIG. 13 is a plan view illustrating a first example of a correspondence relationship in assignment of four perspective images between an assignment pattern and an arrangement pattern of scattering regions in the pixel structure shown in FIG. 9, and (B) of FIG. 13 is a sectional view illustrating the correspondence relationship.

Figure 14:
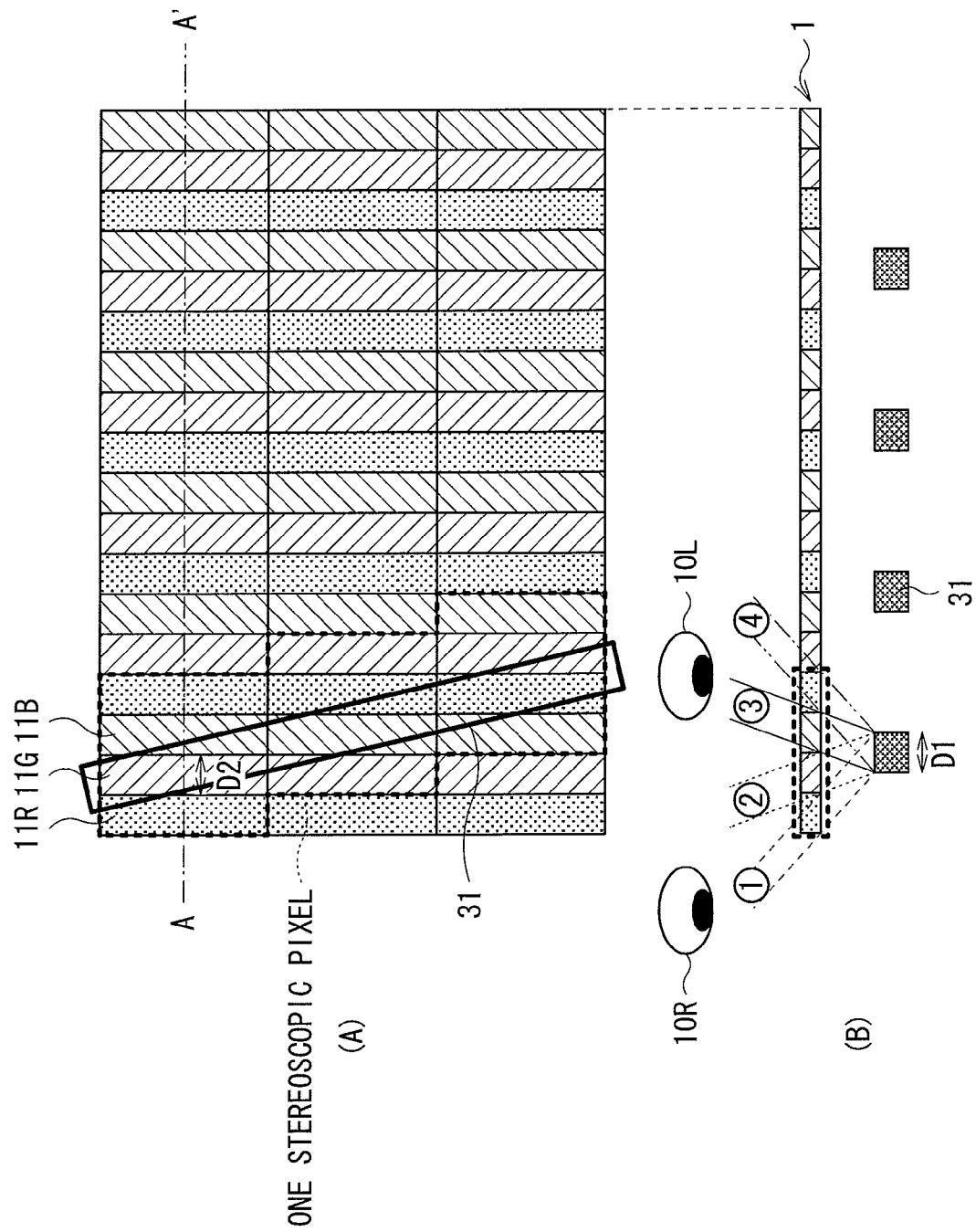

(A) of FIG. 14 is a plan view illustrating a second example of the correspondence relationship between the assignment pattern in assignment of four perspective images and the arrangement pattern of scattering regions in the pixel structure shown in FIG. 9, and (B) of FIG. 14 is a sectional view illustrating the correspondence relationship.

Figure 15:
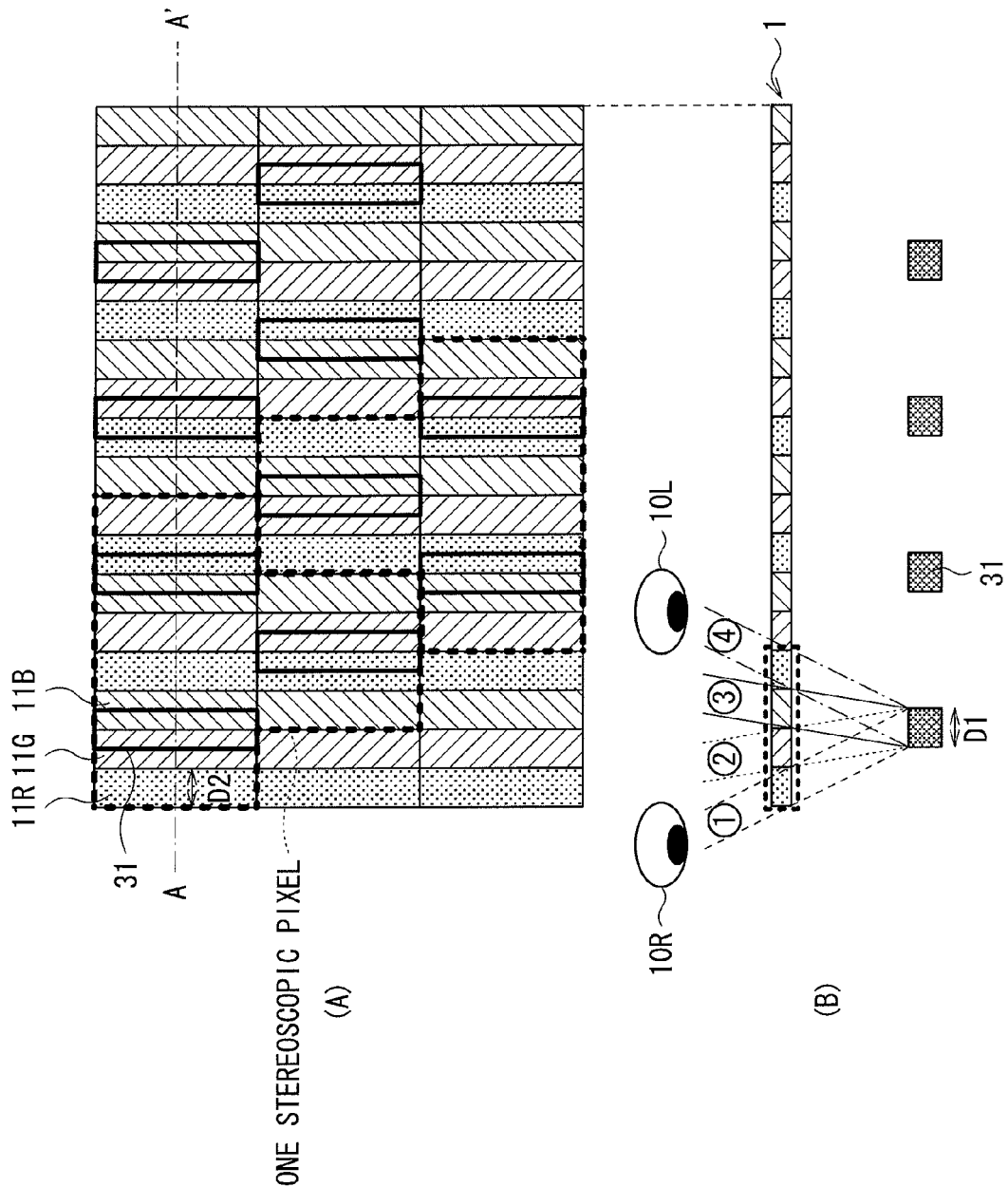

(A) of FIG. 15 is a plan view illustrating a third example of the correspondence relationship between the assignment pattern in assignment of four perspective images and the arrangement pattern of scattering regions in the pixel structure shown in FIG. 9, and (B) of FIG. 15 is a sectional view illustrating the correspondence relationship.

Figure 16A:
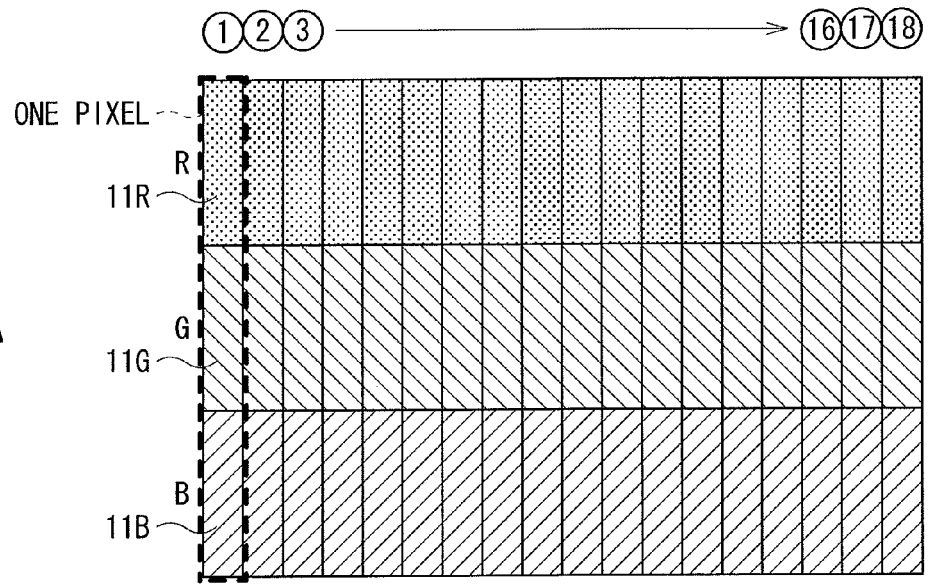
Figure 16B:
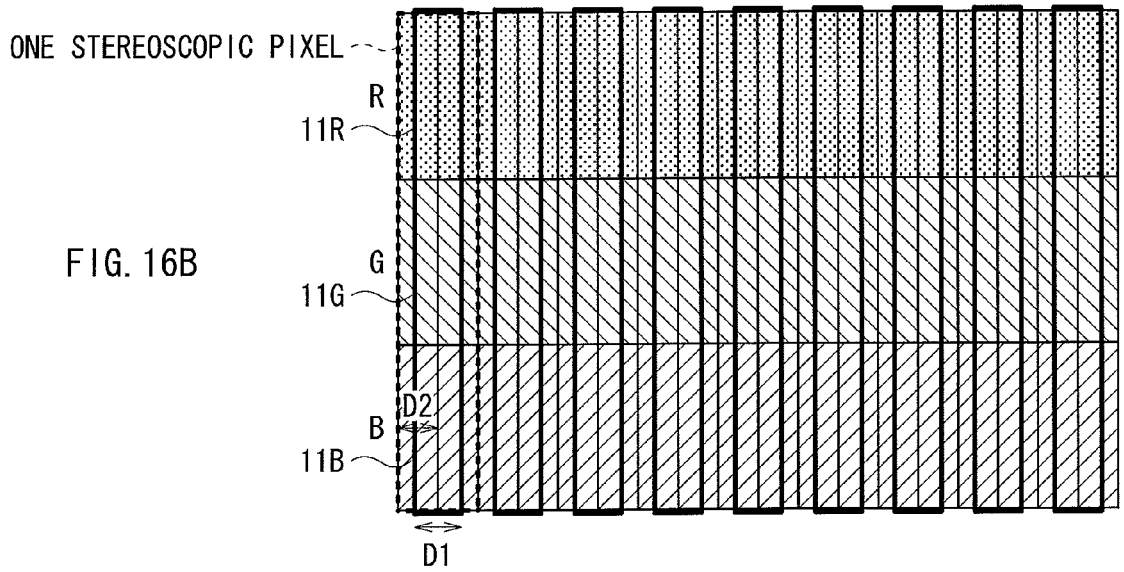

FIG. 16A is a plan view illustrating a second example of the pixel structure of the display section, and FIG. 16B is a plan view illustrating an example of a correspondence relationship between an assignment pattern in assignment of two perspective images and an arrangement pattern of scattering regions in the pixel structure shown in FIG. 16A.

Figure 1:
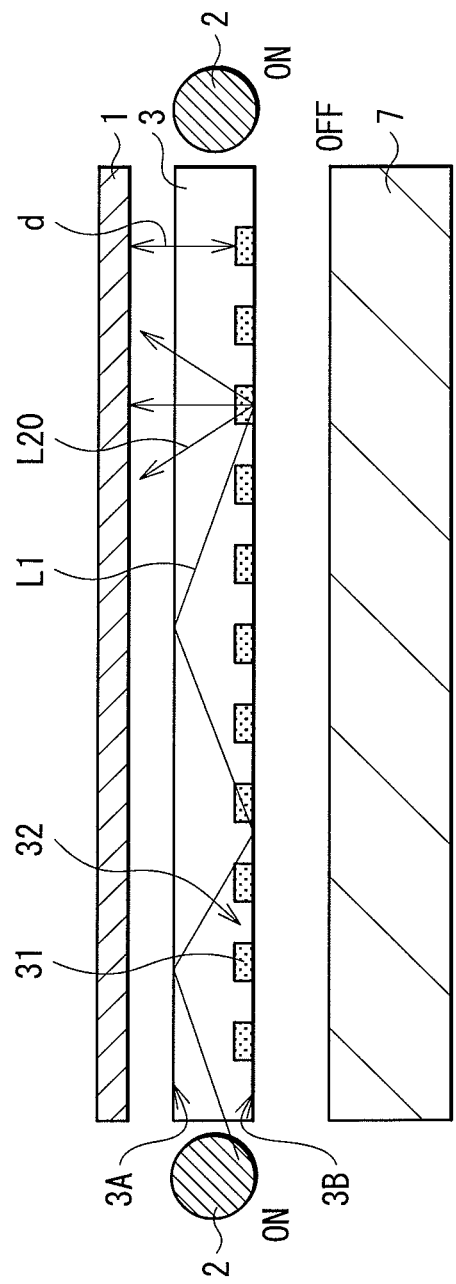
FIG. 1 is a sectional view illustrating an exemplary configuration of a display according to a first embodiment of the disclosure together with light rays output from a light source device in the case where only first light sources are on (lit).

FIG. 17A is a characteristic diagram illustrating luminance distribution in a Y direction in the case where only the first light sources are on (lit) in the light source device shown in FIG. 1; FIG. 17B is a plan view of the light source device shown in FIG. 1; and FIG. 17C is a side view of the light source device shown in FIG. 1 as viewed from an X direction.

Figure 18:
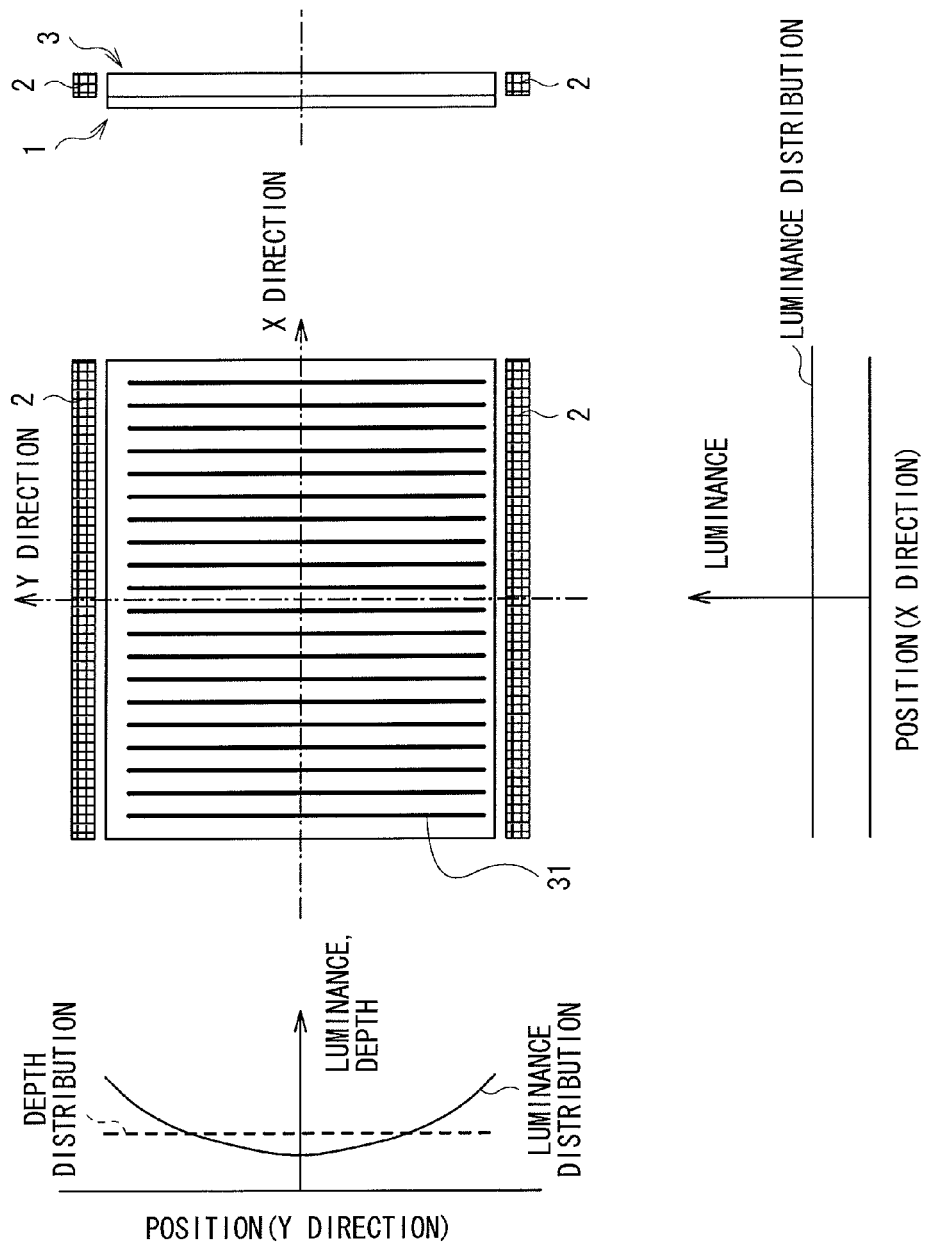

FIG. 18 is an explanatory view illustrating luminance distribution in Y and X directions in the case where the first light sources are oppositely disposed on first and second side faces in the Y direction of the light guide plate in the light source device shown in FIG. 1.

Figure 19:
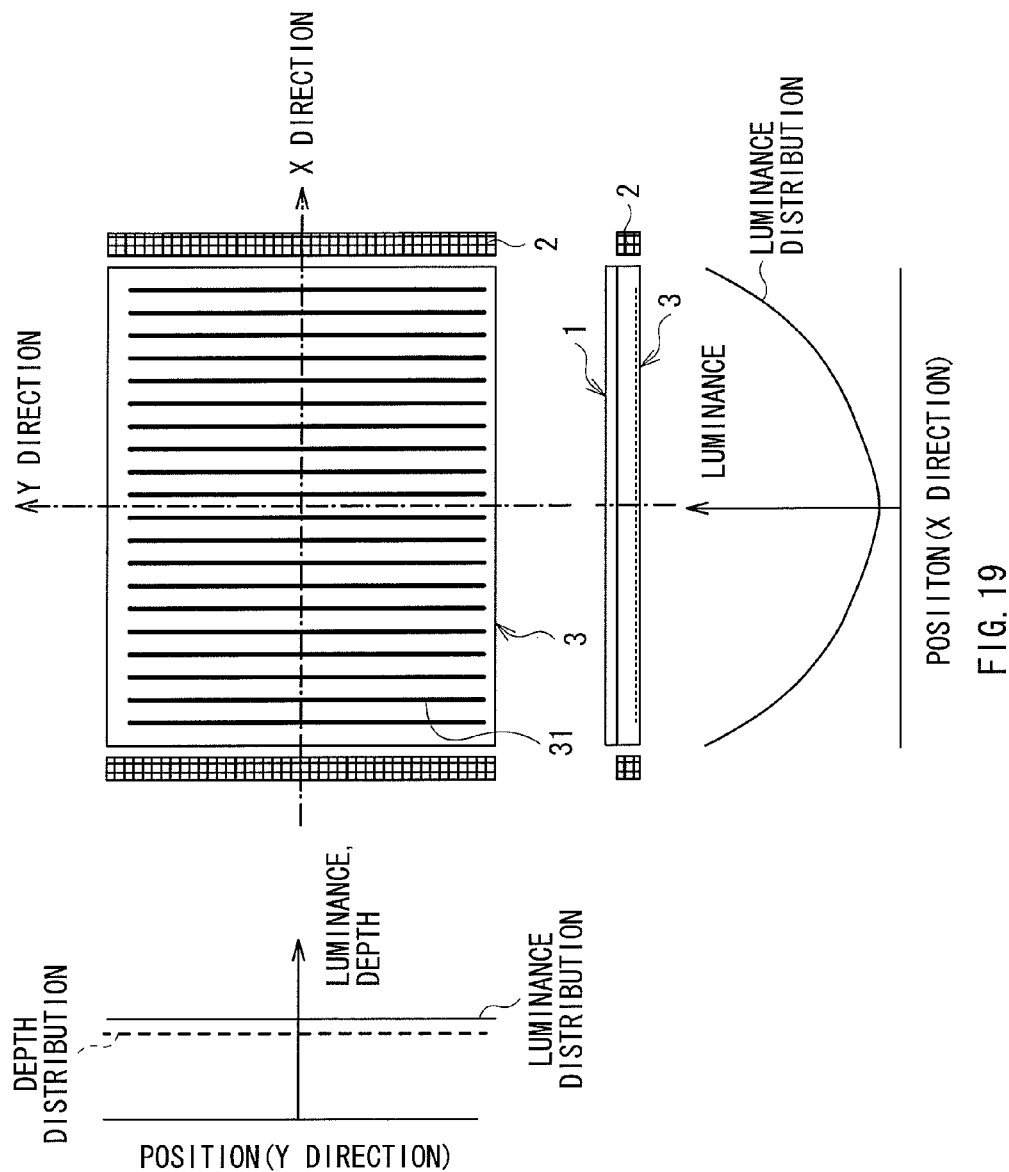

FIG. 19 is an explanatory view illustrating luminance distribution in Y and X directions in the case where the first light sources are oppositely disposed on third and fourth side faces in the X direction of the light guide plate in the light source device shown in FIG. 1.

Figure 20:
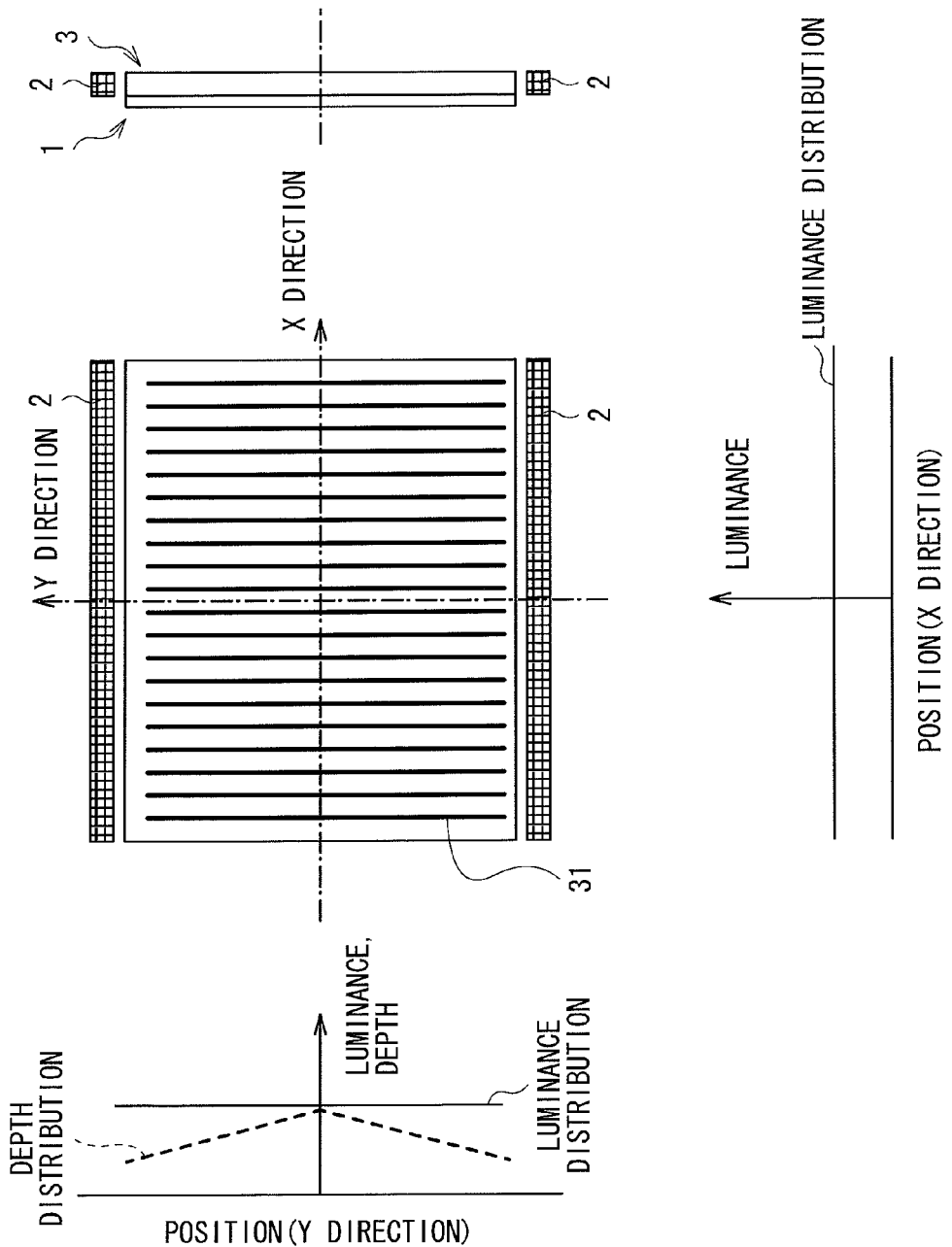

FIG. 20 is an explanatory view illustrating a first example of improvement in luminance distribution through variation of a structure (height) of the scattering regions in FIG. 18.

Figure 21:
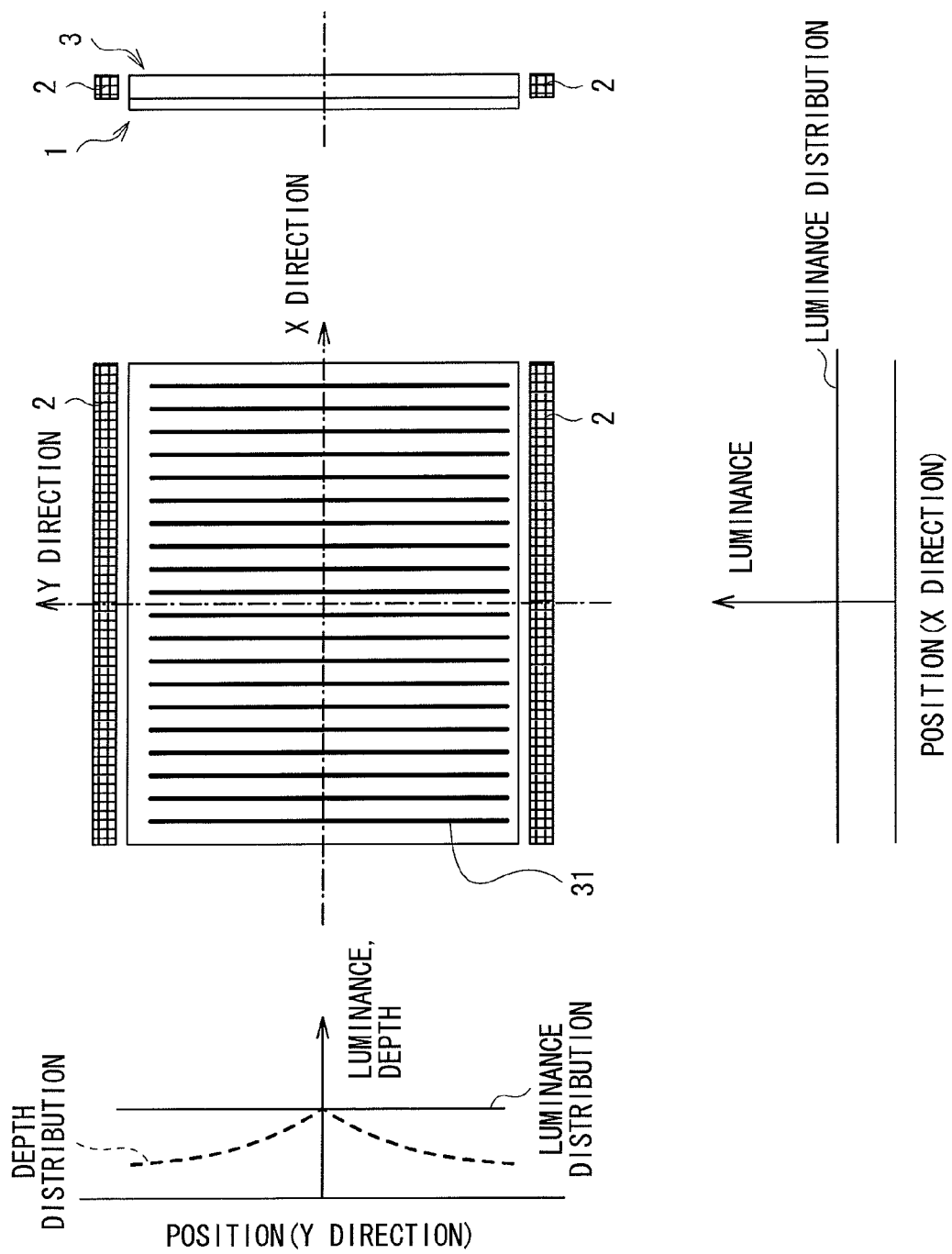

FIG. 21 is an explanatory view illustrating a second example of improvement in luminance distribution through variation of a structure (height) of the scattering regions in FIG. 18.

Figure 22:
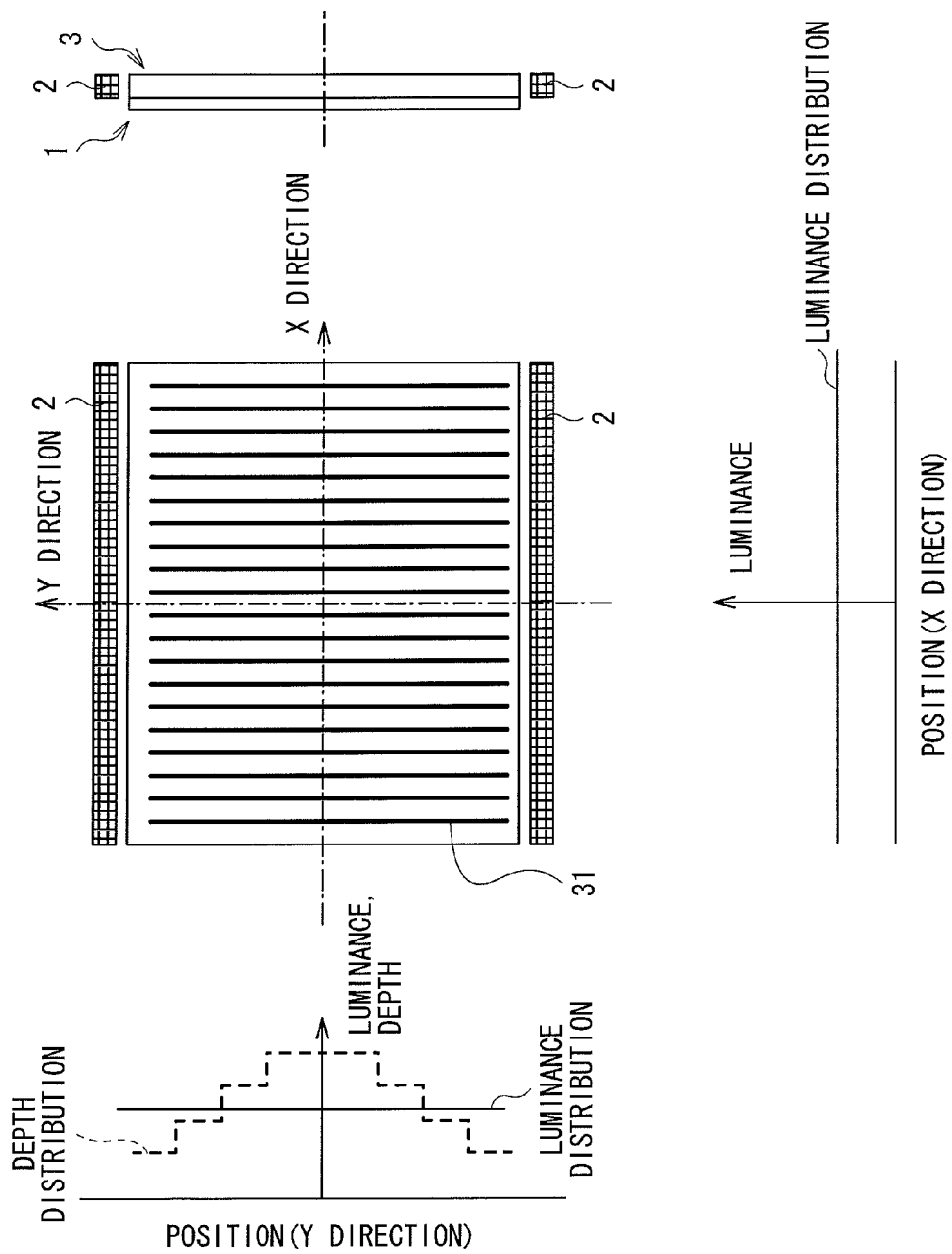

FIG. 22 is an explanatory view illustrating a third example of improvement in luminance distribution through variation of a structure (height) of the scattering regions in FIG. 18.

Figure 23:
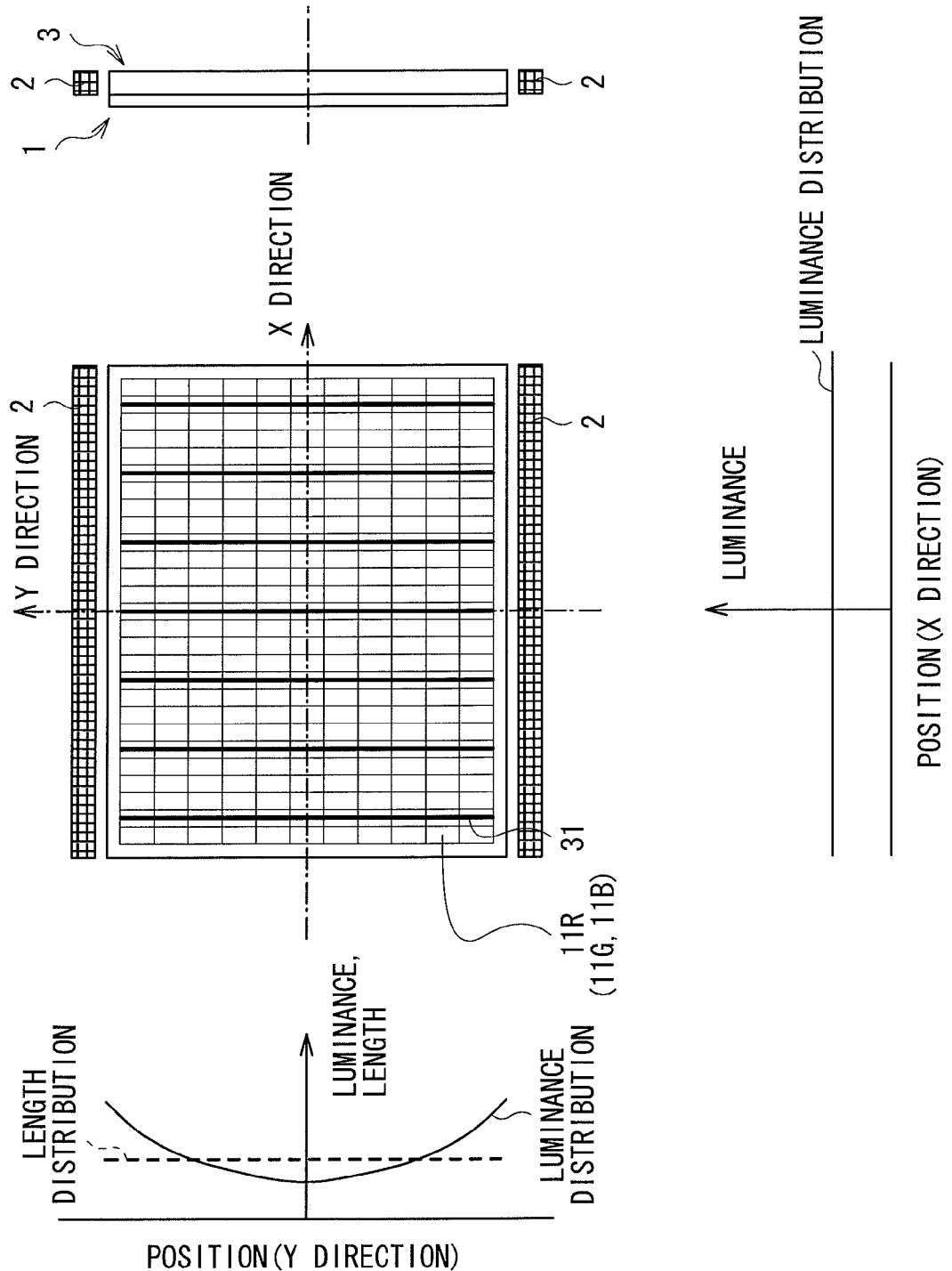

FIG. 23 is an explanatory view illustrating luminance distribution in Y and X directions in the case where the first light sources are oppositely disposed on the first and second side faces in the Y direction of the light guide plate in the light source device shown in FIG. 1.

Figure 24:
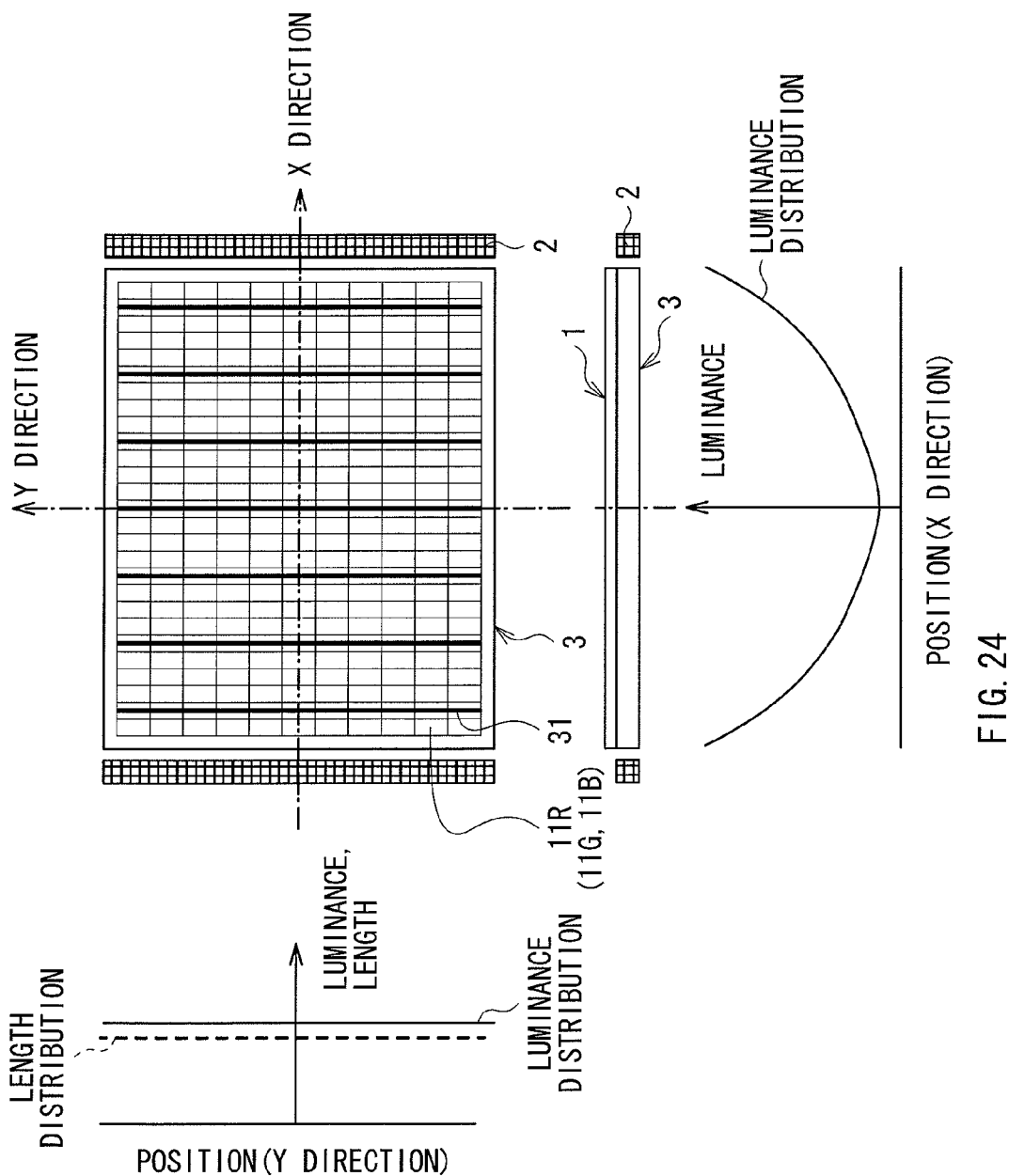

FIG. 24 is an explanatory view illustrating luminance distribution in Y and X directions in the case where the first light sources are oppositely disposed on the third and fourth side faces in the X direction of the light guide plate in the light source device shown in FIG. 1.

Figure 25:
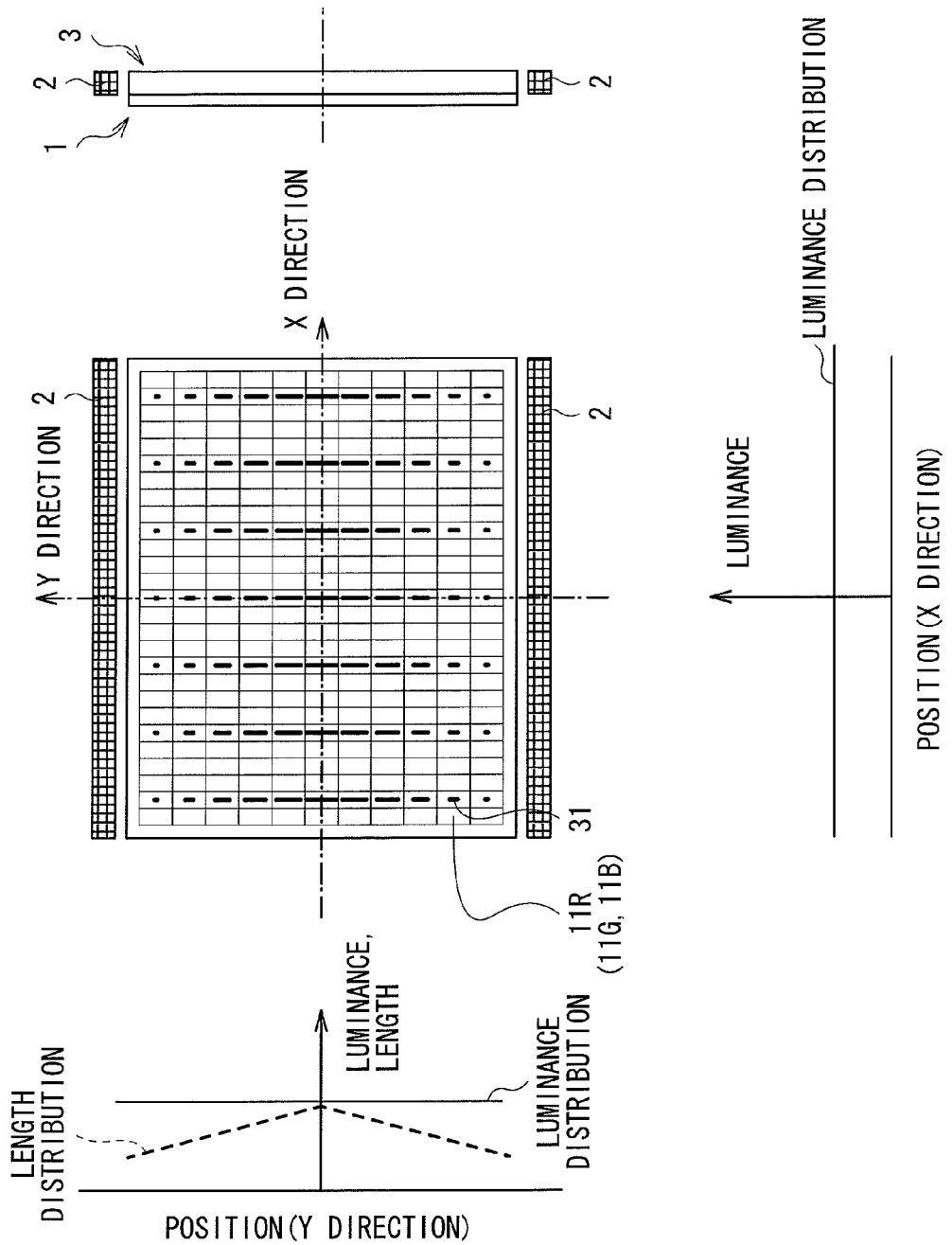

FIG. 25 is an explanatory view illustrating an example of improvement in luminance distribution through variation of a structure (length) of the scattering regions in FIG. 23.

Figure 26:
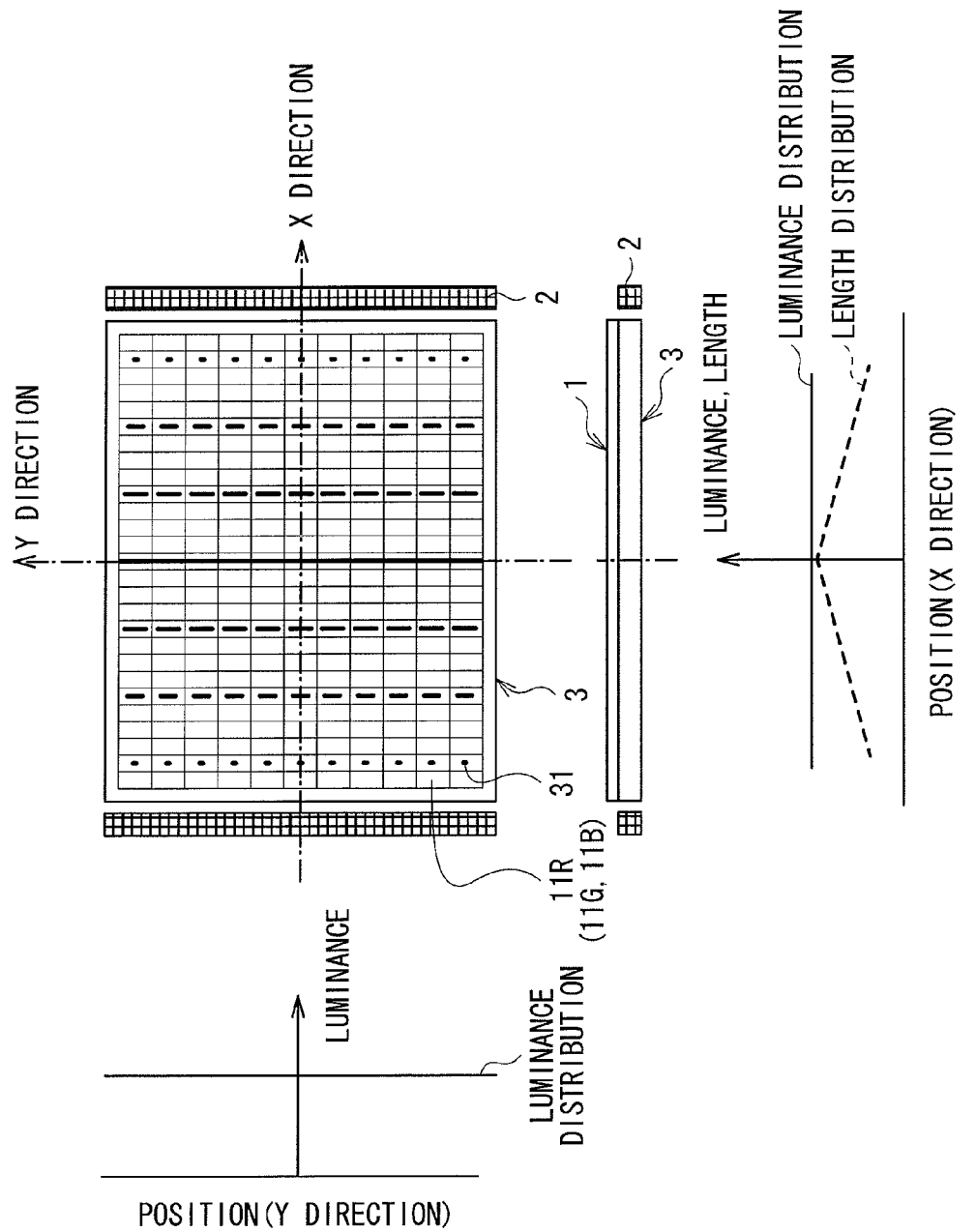

FIG. 26 is an explanatory view illustrating an example of improvement in luminance distribution through variation of a structure (length) of the scattering regions in FIG. 24.

Figure 27A:
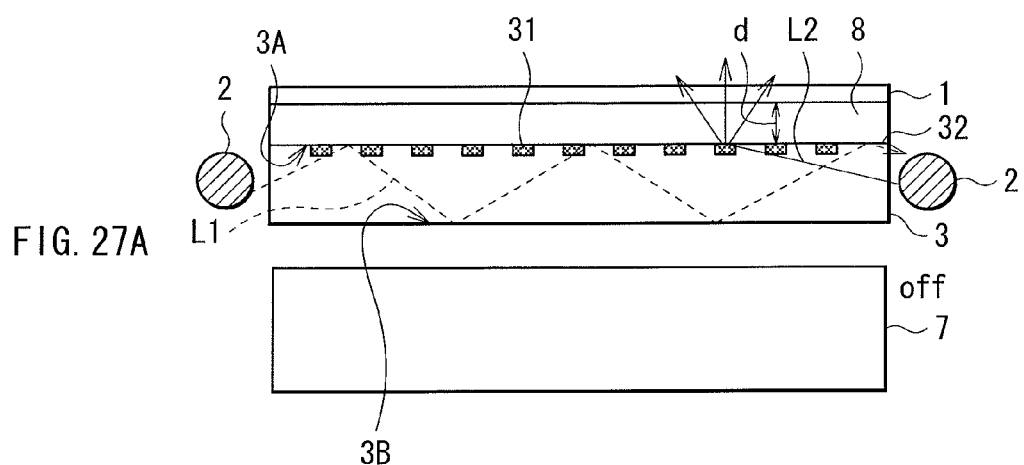
Figure 27B:
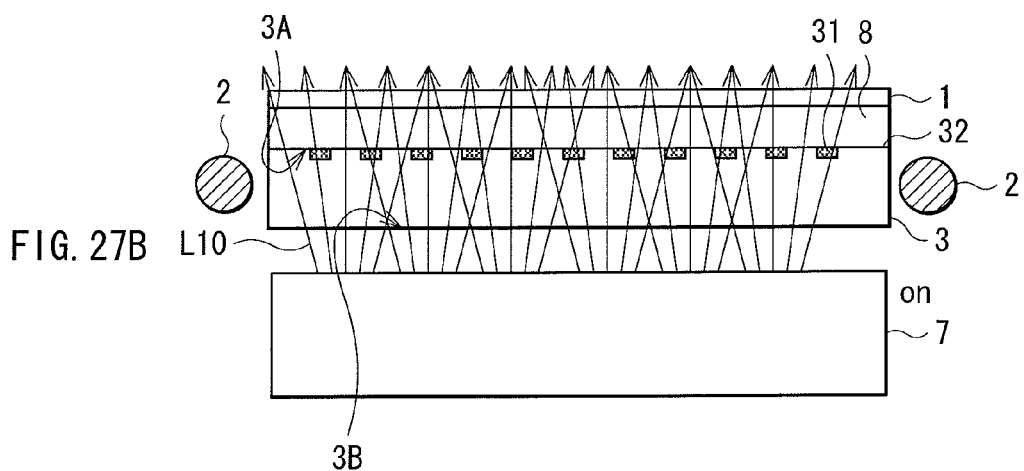

FIGS. 27A and 27B are sectional views illustrating an exemplary configuration of a display according to a second embodiment together with light rays output from a light source device, where FIG. 27A shows light rays output during three-dimensional display, and FIG. 27B shows light rays output during two-dimensional display.

Figure 28A:
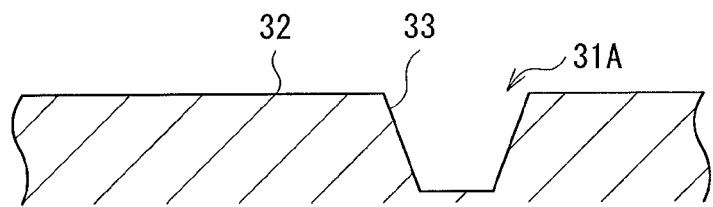
Figure 28B:
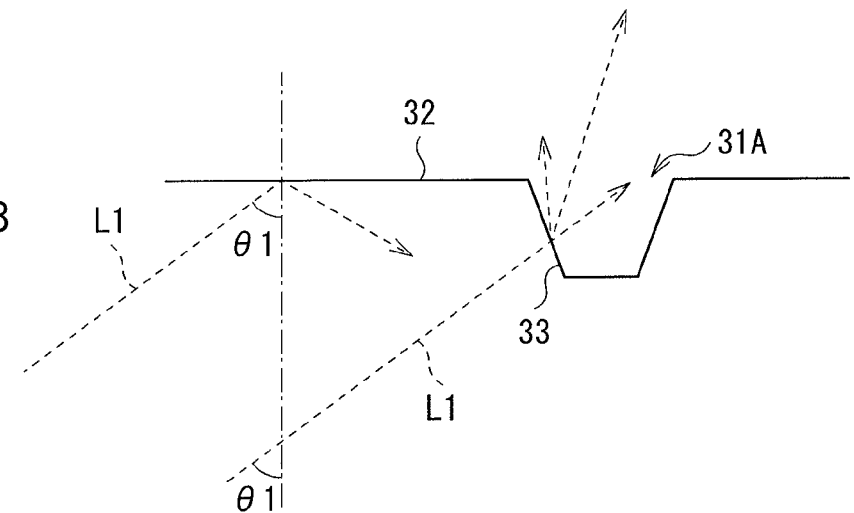

FIG. 28A is a sectional view illustrating a first exemplary configuration of a surface of a light guide plate of the display shown in FIGS. 27A and 27B, and FIG. 28B is an explanatory view schematically illustrating light rays scatter-reflected on the surface of the light guide plate shown in FIG. 28A.

Figure 29A:
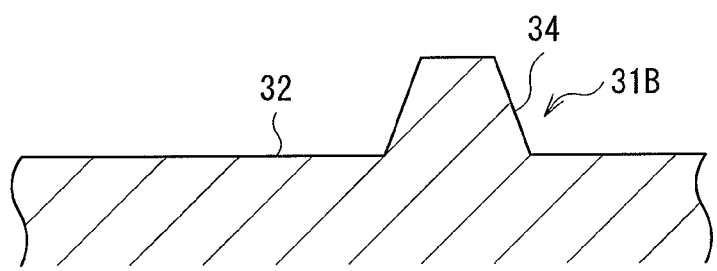
Figure 29B:
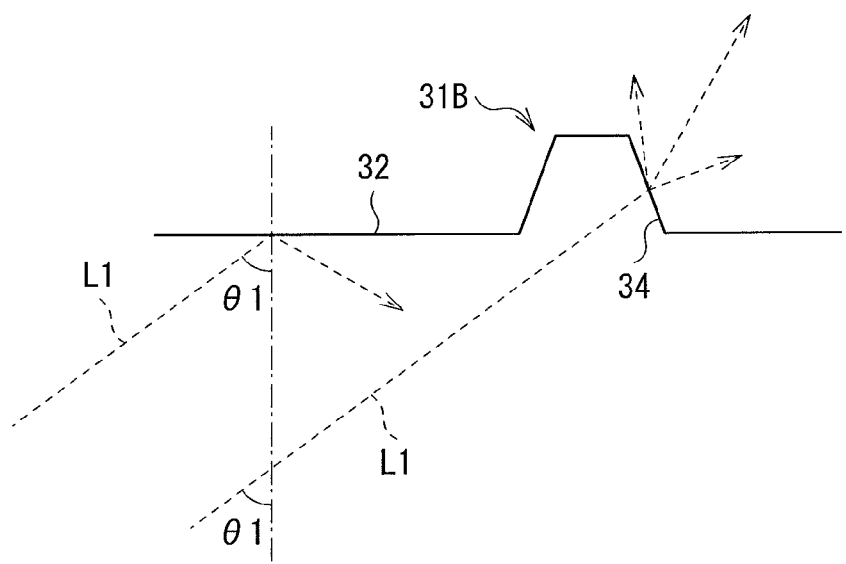

FIG. 29A is a sectional view illustrating a second exemplary configuration of the surface of the light guide plate of the display shown in FIGS. 27A and 27B, and FIG. 29B is an explanatory view schematically illustrating light rays scatter-reflected on the surface of the light guide plate shown in FIG. 29A.

Figure 30A:
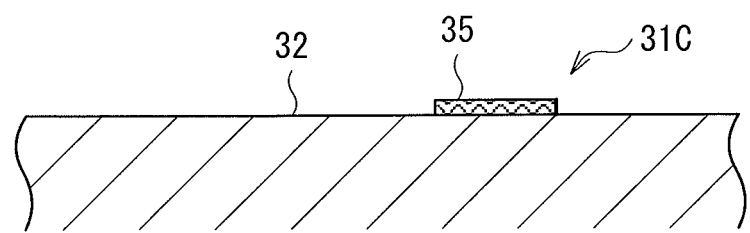
Figure 30B:
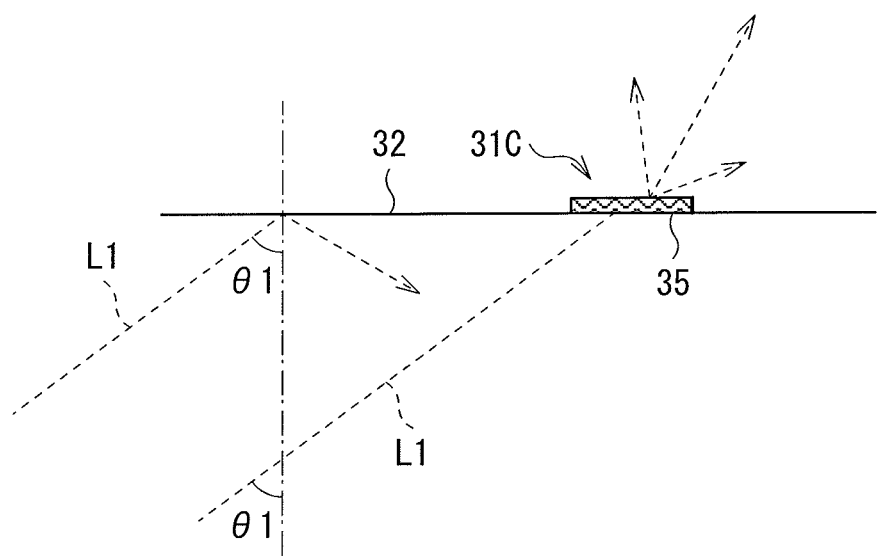

FIG. 30A is a sectional view illustrating a third exemplary configuration of the surface of the light guide plate of the display shown in FIGS. 27A and 27B, and FIG. 30B is an explanatory view schematically illustrating light rays scatter-reflected on the surface of the light guide plate shown in FIG. 30A.

Figure 31:
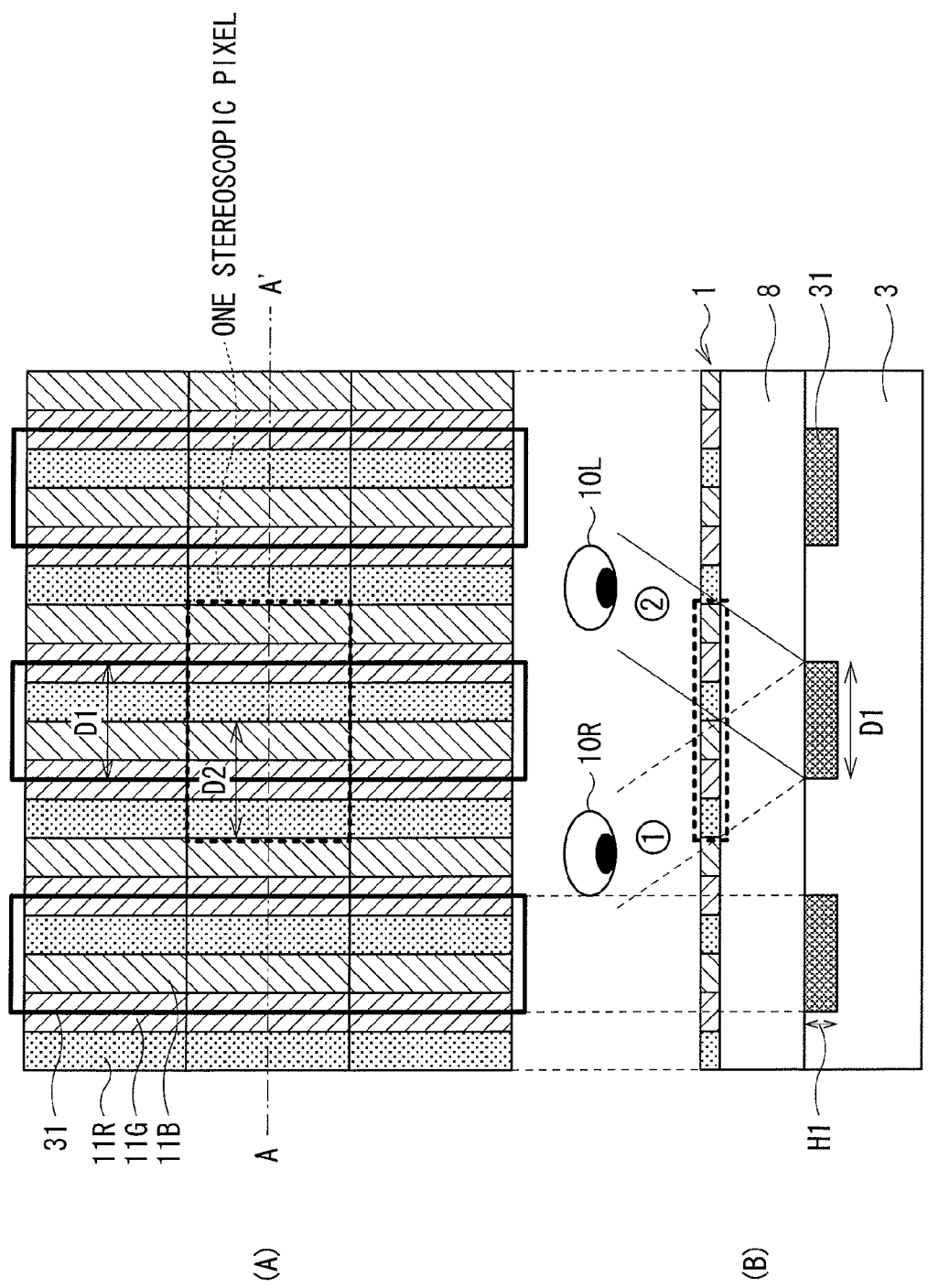

(A) of FIG. 31 is a plan view illustrating an exemplary correspondence relationship between an assignment pattern in assignment of two perspective images and an arrangement pattern of the scattering regions in the pixel structure shown in FIGS. 27A and 27B, and (B) of FIG. 31 is a sectional view illustrating the correspondence relationship.

Figure 32A:
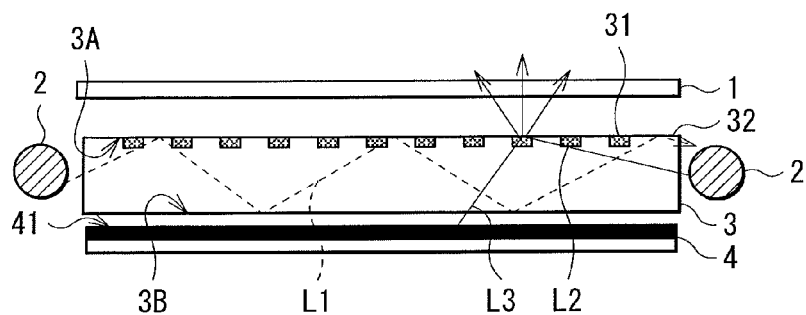
Figure 32B:
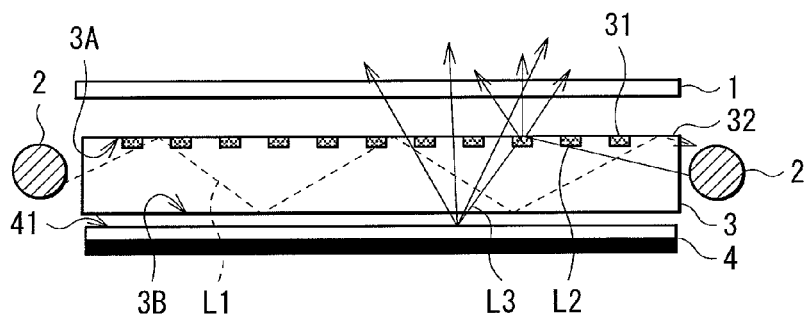

FIGS. 32A and 32B are sectional views illustrating an exemplary configuration of a display according to a third embodiment of the disclosure together with light rays output from a light source device, where FIG. 32A shows light rays output during three-dimensional display, and FIG. 32B shows light rays output during two-dimensional display.

Figure 33A:
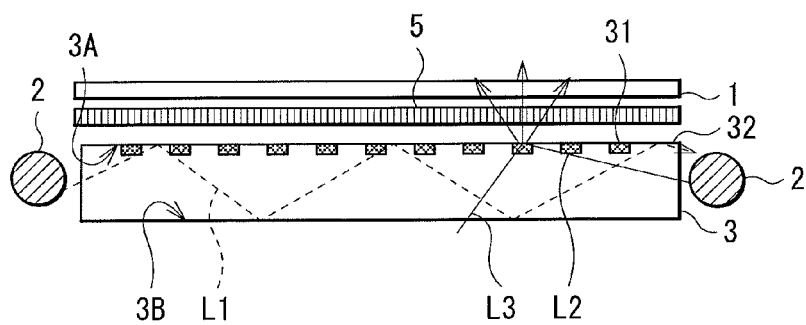
Figure 33B:
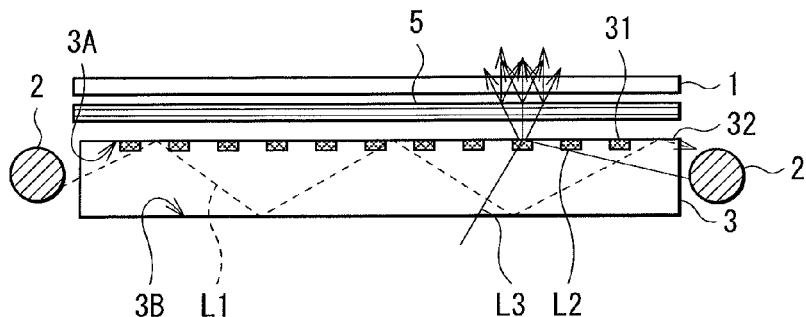

FIGS. 33A and 33B are sectional views illustrating an exemplary configuration of a display according to a fourth embodiment of the disclosure together with light rays output from a light source device, where FIG. 33A shows light rays output during three-dimensional display, and FIG. 33B shows light rays output during two-dimensional display.

Figure 34:
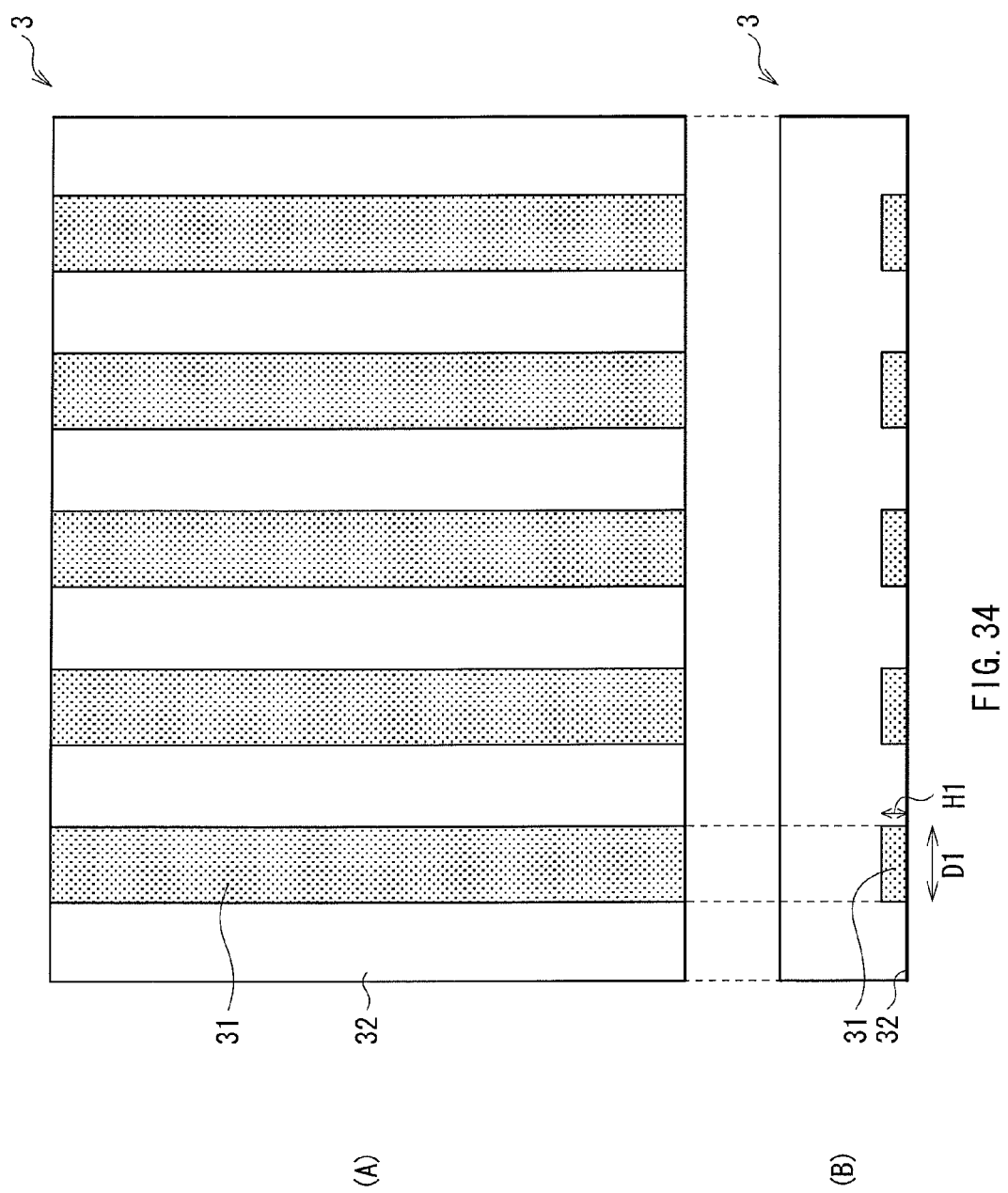

(A) of FIG. 34 is a plan view illustrating an exemplary configuration where the entire scattering region is formed as a scattering portion, and (B) of FIG. 34 is a sectional view illustrating the configuration.

Figure 35:
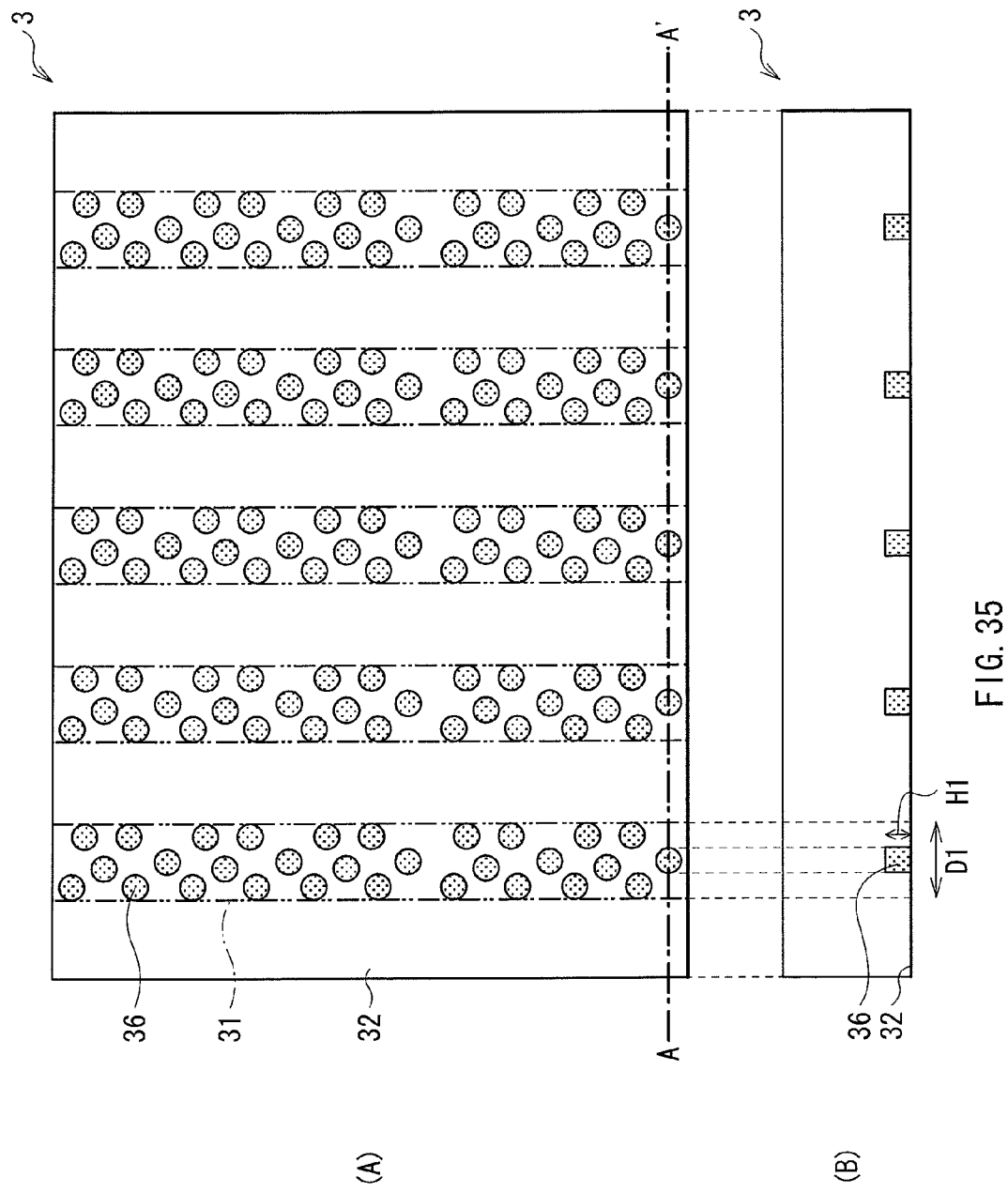

(A) of FIG. 35 is a plan view illustrating an exemplary configuration where a scattering region has a plurality of scattering portions therein, and (B) of FIG. 35 is a sectional view along a line A-A' in (A) of FIG. 35.

Figure 36:
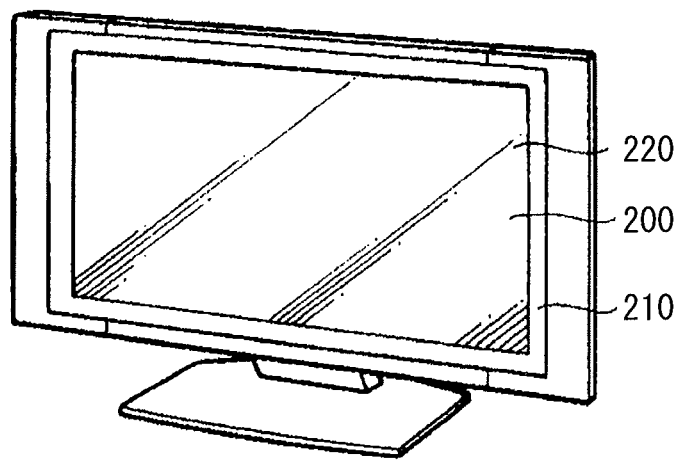

FIG. 36 is an appearance diagram illustrating an example of an electronic unit.

DETAILED DESCRIPTION OF EMBODIMENT

Hereinafter, embodiments of the disclosure will be described in detail with reference to the accompanying drawings. It is to be noted that description is made in the following order.

1. First embodiment
Example where first and second light sources are used.
Example where scattering regions are provided on second internal reflection face.
2. Modifications of first embodiment
Example of improvement in luminance distribution.
3. Second embodiment
Example where first and second light sources are used.
Example where scattering regions are provided on first internal reflection face.
4. Third embodiment
Example where first light source and electronic paper are used.
5. Fourth embodiment
Example where first light source and polymer diffuser plate are used.
6. Other embodiments

1. First Embodiment

[Overall Configuration of Display]

Figure 2:
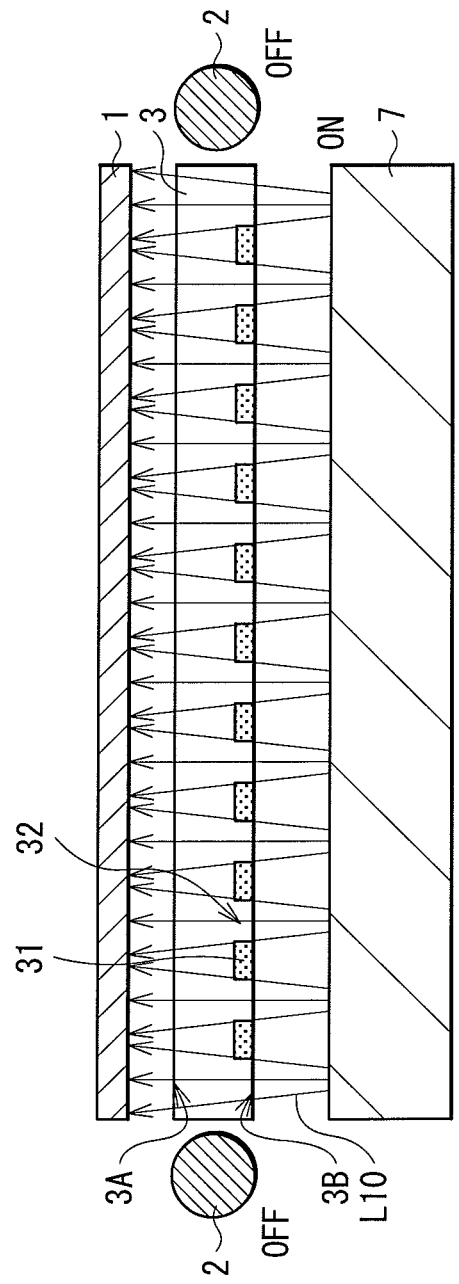
FIG. 2 is a sectional view illustrating the exemplary configuration of the display shown in FIG. 1 together with light rays output from the light source device in the case where only a second light source is on (lit).
Figure 3:
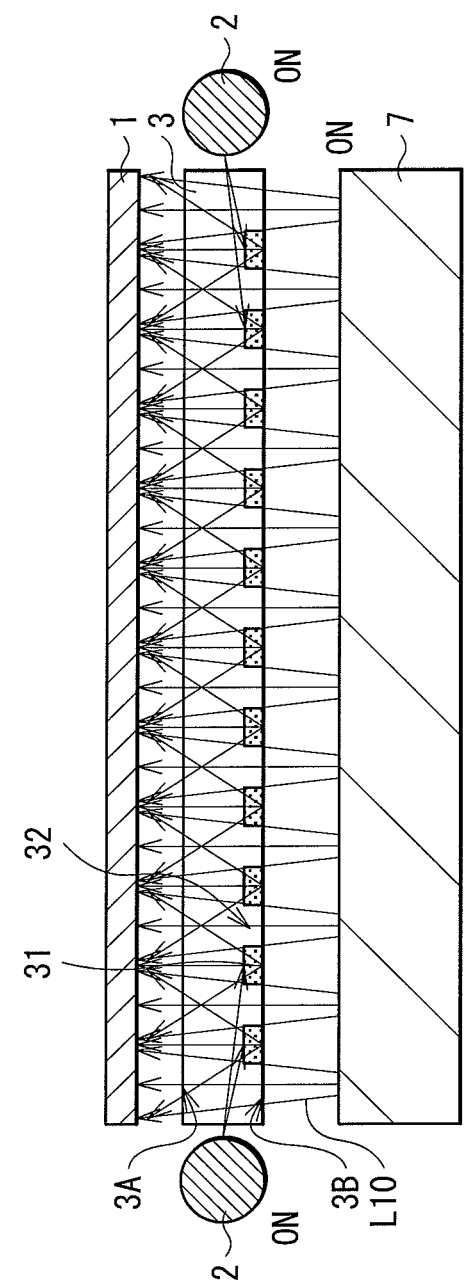
FIG. 3 is a sectional view illustrating the exemplary configuration of the display shown in FIG. 1 together with light rays output from the light source device in the case where both the first and second light sources are on (lit).

FIGS. 1 to 3 illustrate an exemplary configuration of a display according to a first embodiment of the disclosure. The display includes a display section 1 for image display and a light source device that is disposed on a back of the display section 1 and outputs light for image display to the display section 1. The light source device includes first light sources 2 (light sources for two-dimensional (2D)/three-dimensional (3D) display), a light guide plate 3, and a second light source 7 (light source for 2D display). The light guide plate 3 has a first internal reflection face 3A disposed close and opposite to the display section 1 and a second internal reflection face 3B disposed close and opposite to the second light source 7. It is to be noted that while the display includes other display components such as a control circuit for the display section 1, description of them is omitted because they have configurations similar to those of typical components such as a typical display control circuit. The light source device further includes an undepicted control circuit that controls each of the first and second light sources 2 and 7 to be on (lit) or off (unlit).

The display is appropriately selectively switched between a full-screen two-dimensional (2D) display mode and a full-screen three-dimensional (3D) display mode. The switching between the two-dimensional display mode and the three-dimensional display mode is enabled through switching control of image data displayed on the display section 1 and on/off switching control of each of the first and second light sources 2 and 7. FIG. 1 schematically illustrates light rays output from the light source device in the case where only the first light sources 2 are on (lit), which corresponds to the three-dimensional display mode. FIG. 2 schematically illustrates light rays output from the light source device in the case where only the second light source 7 is on (lit), which corresponds to the two-dimensional display mode. FIG. 3 schematically illustrates light rays output from the light source device in the case where both the first and second light sources 2 and 7 are on (lit), which also corresponds to the two-dimensional display mode.

The display section 1 includes a transmissive two-dimensional display panel, for example, a transmissive liquid crystal display panel, and has a plurality of pixels arranged in a matrix, including red (R) pixels 11R, green (G) pixels 11G, and blue (B) pixels 11B as shown in FIG. 9, for example. The display section 1 modulates light from the light source device for each of the pixels depending on image data for two-dimensional image display. The display section 1 displays a plurality of perspective images based on three-dimensional image data and images based on two-dimensional image data in an appropriately and selectively switched manner. It is to be noted that the three-dimensional image data refers to, for example, data including a plurality of perspective images corresponding to a plurality of viewing angle directions in three-dimensional display. In the case of two-eye-type three-dimensional display, the three-dimensional image data correspond to, for example, perspective image data for right eye display and for left eye display. For example, a composite image composed of a plurality of stripe-shaped perspective images in one screen is formed and displayed for display in the three-dimensional display mode. It is to be noted that an exemplary correspondence relationship between an assignment pattern of a plurality of perspective images to each pixel of the display section 1 and an arrangement pattern of scattering regions 31 is specifically described in detail below.

The first light source 2 includes, for example, a fluorescent lamp such as a cold cathode fluorescent lamp (CCFL) or a light emitting diode (LED). The first light source 2 laterally applies first illumination light L1 (FIG. 1) to the inside of the light guide plate 3 from the side face. One or more first light sources 2 are disposed on respective side faces of the light guide plate 3. For example, if the light guide plate 3 has a rectangular planar shape having four side faces, one or more first light sources 2 may be disposed on one or more side faces. FIG. 1 illustrates an exemplary configuration where the first light sources 2 are disposed on respective two opposed side faces of the light guide plate 3. Each of the first light sources 2 is controlled to be on (lit) or off (unlit) in response to switching modes between the two-dimensional display mode and the three-dimensional display mode. In detail, the first light source 2 is controlled to be lit for image display on the display section 1 based on the three-dimensional image data (in the case of the three-dimensional display mode), and controlled to be unlit or to lit for image display on the display section 1 based on the two-dimensional image data (in the case of the two-dimensional display mode).

The second light source 7 is disposed opposite to the light guide plate 3 close to the second internal reflection face 3B. The second light source 7 applies second illumination light L10 (see FIGS. 2 and 3) to the second internal reflection face 3B from the outside. Any planar light source that emits light having uniform in-plane luminance, such as a commercially available planar backlight, may be used as the second light source 7 without any structural limitation. For example, a possible structure includes a light emitting body such as CCFL or LED, and a light diffuser plate allowing uniform in-plane luminance. The second light source 7 is controlled to be on (lit) or off (unlit) in response to switching modes between the two-dimensional display mode and the three-dimensional display mode. In detail, the second light source 7 is controlled to be unlit for image display on the display section 1 based on the three-dimensional image data (in the case of the three-dimensional display mode), and controlled to be lit for image display on the display section 1 based on the two-dimensional image data (in the case of the two-dimensional display mode).

The light guide plate 3 includes, for example, a transparent plastic plate including acrylic resin. Surfaces of the light guide plate 3 other than the second internal reflection face 3B are entirely transparent. For example, if the light guide plate 3 has a rectangular planar shape, the first internal reflection face 3A and four side faces are entirely transparent.

The first internal reflection face 3A is entirely mirror-finished, and thus internally totally reflects light rays incident at an angle that satisfies a total reflection condition in the inside of the light guide plate 3, and outputs light rays that do not satisfy the total reflection condition to the outside.

The second internal reflection face 3B has the scattering regions 31 and total reflection regions 32. The scattering regions 31 are formed on a surface of the light guide plate 3 through laser processing, sandblasting processing, coating processing, or attachment of a sheet-like light-scattering member, as described below. On the second internal reflection face 3B, the scattering regions 31 function as the openings (slit portions) of the parallax barrier for the first illumination light L1 from the first light source 2, and the total reflection regions 32 function as the light-shielding portions of the parallax barrier, during the three-dimensional display mode. On the second internal reflection face 3B, the scattering regions 31 and the total reflection regions 32 are provided in a pattern defining a structure corresponding to the parallax barrier. Specifically, the total reflection regions 32 are provided in a pattern corresponding to the light-shielding portions of the parallax barrier, and the scattering regions 31 are provided in a pattern corresponding to the openings thereof. It is to be noted that a barrier pattern of the parallax barrier may include various types of patterns without any limitation, for example, a stripe-shaped pattern where a large number of vertically-elongated slit-like openings are horizontally arranged in parallel with the light-shielding portion therebetween.

The first internal reflection face 3A and the total reflection regions 32 of the second internal reflection face 3B internally totally reflect light rays incident at an angle $\theta 1$ that satisfies the total reflection condition (internally totally reflect light rays incident at an angle $\theta 1$ larger than a predetermined critical angle $\alpha$). As a result, the first illumination light L1 from the first light source 2, the light L1 being incident at the angle $\theta 1$ that satisfies the total reflection condition, is laterally guided through internal total reflection between the first internal reflection face 3A and the total reflection regions 32 of the second internal reflection face 3B. The total reflection regions 32 transmit the second illumination light L10 from the second light source 7 and outputs the transmitted light, as light rays that do not satisfy the total reflection condition, to the first internal reflection face 3A, as shown in FIG. 2 or 3.

When the refractive index of the light guide plate 3 is denoted as n1, and the refractive index of a medium (an air layer) outside the light guide plate 3 is denoted as n0 (<n1), the critical angle $\alpha$ is represented as follows. Each of the angles $\alpha$ and $\theta 1$ is defined as an angle with respect to a normal to a surface of the light guide plate. The incident angle $\theta 1$ that satisfies the total reflection condition is larger than the critical angle $\alpha$.

$$\sin \alpha = n0/n1.$$

As shown in FIG. 2, the scattering regions 31 scatter-reflects the first illumination light L1 from the first light source 2, and outputs part or all of the first illumination light L1 to the first internal reflection face 3A as light rays (scattered light rays L20) that do not satisfy the total reflection condition.

[Modifications of Configuration of Display]

Figure 4:
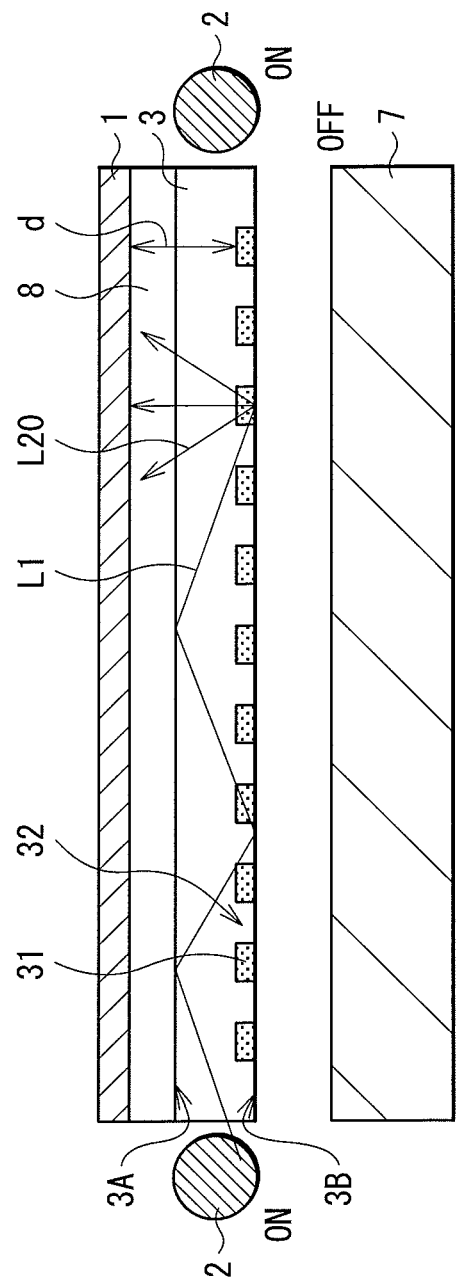
FIG. 4 is a sectional view illustrating a first modification of the display shown in FIG. 1.

In the display shown in FIG. 1, pixels of the display section 1 and the scattering regions 31 of the light guide plate 3 need to be disposed opposite to each other with a predetermined distance d therebetween for spatial separation of the plurality of perspective images displayed on the display section 1. Although an air gap is provided between the display section 1 and the light guide plate 3 in FIG. 1, a spacer 8 may be disposed between the display section 1 and the light guide plate 3 in order to maintain the predetermined distance d, as shown in a first modification illustrated in FIG. 4. The spacer 8 may include any material that is colorless, transparent, and low light-scatterable, for example, PMMA. The spacer 8 may be provided to entirely cover the back of the display section 1 and the front surface of the light guide plate 3, or may be partially provided to the minimum necessary to maintain the predetermined distance d.

Figure 5:
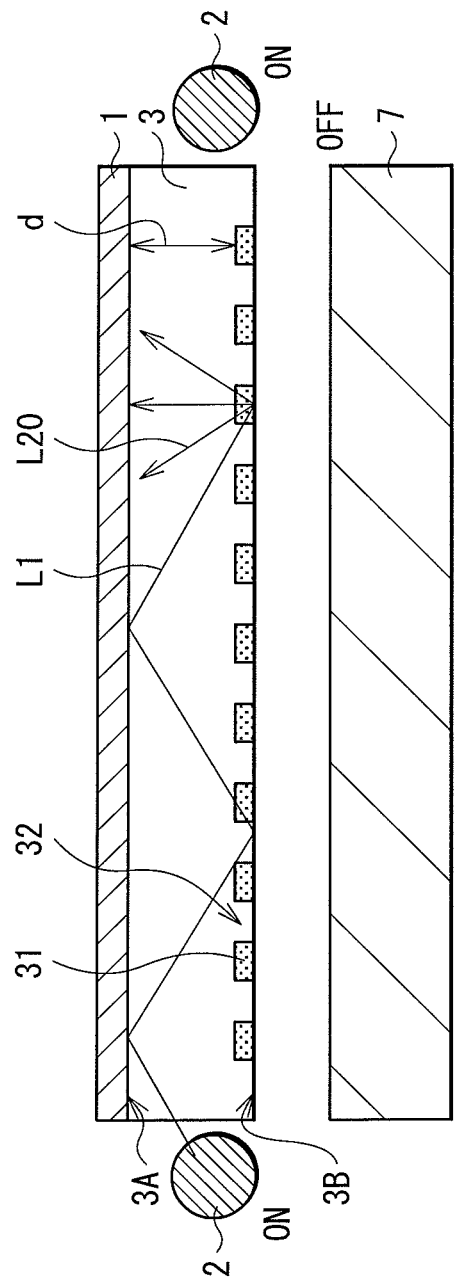
FIG. 5 is a sectional view illustrating a second modification of the display shown in FIG. 1.

Alternatively, thickness of the light guide plate 3 is entirely increased to eliminate the air gap as in a second modification shown in FIG. 5.

[Specific Exemplary Configuration of Scattering Region 31]

FIG. 6A illustrates a first exemplary configuration of the second internal reflection face 3B of the light guide plate 3. FIG. 6B schematically illustrates a reflecting state and a scattering state of light rays on the second internal reflection face 3B as the first exemplary configuration shown in FIG. 6A. In the first exemplary configuration, the scattering regions 31 are formed as scattering regions 31A that are concave with respect to the total reflection regions 32. Such concave scattering regions 31A are formed by, for example, sandblasting processing or laser processing. For example, the concave scattering regions 31A are formed by mirror-finishing of a surface of the light guide plate 3 and then laser processing of corresponding portions. In the first exemplary configuration, first illumination light L11 from the first light source 2, the light L11 being incident at an angle $\theta 1$ that satisfies the total reflection condition, is internally totally reflected by the total reflection regions 32 on the second internal reflection face 3B. In contrast, in the concave scattering regions 31A, part of first illumination light L12 does not satisfy the total reflection condition on a side face portion 33 of each concave scattering region 31A even if the first illumination light L12 enters the concave scattering regions 31A at the same incident angle θ1 as in the total reflection regions 32. Thus, the first illumination light L12 is partially scatter-transmitted, and the rest is scatter-reflected by the side face portion 33. Part or all of such scatter-reflected light rays (scattered light rays L20), which do not satisfy the total reflection condition, are output to the first internal reflection face 3A as shown in FIG. 1.

FIG. 7A illustrates a second exemplary configuration of the second internal reflection face 3B of the light guide plate 3. FIG. 7B schematically illustrates a reflecting state and a scattering state of light rays on the second internal reflection face 3B as the second exemplary configuration shown in FIG. 7A. In the second exemplary configuration, the scattering regions 31 are formed as scattering regions 31B that are convex with respect to the total reflection regions 32. Such convex scattering regions 31B are formed by, for example, processing of a surface of the light guide plate 3 with die molding. In such a case, the portions corresponding to the total reflection regions 32 are mirror-finished with the surface of a die. In the second exemplary configuration, first illumination light L11 from the first light source 2, the light L11 being incident at an angle θ1 that satisfies the total reflection condition, is internally totally reflected by the total reflection region 32 on the second internal reflection face 3B. In contrast, in the convex scattering region 31B, part of first illumination light L12 does not satisfy the total reflection condition at a side face portion 34 of the convex scattering region 31B even if the first illumination light L12 enters the convex scattering region 31B at the same incident angle θ1 as in the total reflection region 32. Thus, the first illumination light L12 is partially scatter-transmitted, and the rest is scatter-reflected by the side face portion 34. Part or all of such scatter-reflected light rays (scattered light rays L20), which do not satisfy the total reflection condition, are output to the first internal reflection face 3A as shown in FIG. 1.

Figure 8A:
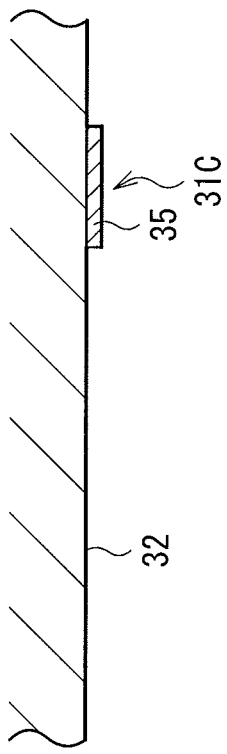
FIG. 8A is a sectional view illustrating a third exemplary configuration of the surface of the light guide plate of the display shown in FIG. 1.
Figure 8B:
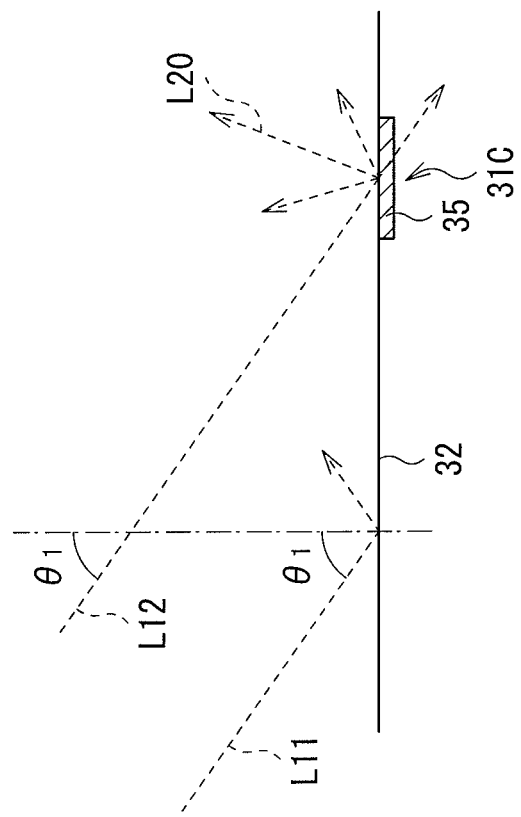
FIG. 8B is an explanatory view schematically illustrating light rays scatter-reflected on the surface of the light guide plate shown in FIG. 8A.

FIG. 8A illustrates a third exemplary configuration of the second internal reflection face 3B of the light guide plate 3. FIG. 8B schematically illustrates a reflecting state and a scattering state of light rays on the second internal reflection face 3B as the third exemplary configuration shown in FIG. 8A. In the exemplary configurations shown in FIGS. 6A and 7A, each scattering region 31 is formed through processing of the surface of the light guide plate 3 into a shape different from the total reflection region 32. In contrast, in the exemplary configuration shown in FIG. 8A, each scattering region 31C is formed by disposing a light scattering member 35, which is formed of a material different from that of the light guide plate 3, on the surface of the light guide plate 3 corresponding to the second internal reflection face 3B, instead of surface processing. In such a case, the scattering region 31C is formed, for example, by forming a pattern of a white paint (for example, barium sulfate-contained paint) as the light scattering member 35 on the surface of the light guide plate 3 by screen printing. In the third exemplary configuration, first illumination light L11 from the first light source 2, the light L11 being incident at the angle θ1 that satisfies the total reflection condition, is internally totally reflected by the total reflection region 32 on the second internal reflection face 3B. In contrast, in the scattering region 31C on which the light scattering member 35 is disposed, first illumination light L12 is partially scatter-transmitted by the light scattering member 35, and the rest is scatter-reflected thereby even if the first illumination light L12 enters the scattering region 31C at the same incident angle θ1 as in the total reflection region 32. Part or all of such scatter-reflected light rays are output to the first internal reflection face 3A as light rays that do not satisfy the total reflection condition.

The scattering regions 31 may include other exemplary configurations without being limited to the above-described exemplary configurations. For example, the portions corresponding to the scattering regions 31 in the surface of the light guide plate 3 may be formed by sandblasting or coating. In addition, while FIGS. 6A and 7A exemplify the scattering regions 31 (the scattering regions 31A and 31B) each having a trapezoidal sectional profile, this is not limitative. Various other sectional shapes such as semicircular and polygonal shapes are allowed to be used.

The plurality of scattering regions 31 may be configured such that each scattering region 31 is entirely formed as a scattering portion as shown in (A) and (B) of FIG. 34, or may be configured such that a plurality of scattering portions 36 are provided in one scattering region 31 as shown in (A) and (B) of FIG. 35. It is to be noted that (A) and (B) of FIG. 34 and (A) and (B) of FIG. 35 illustrate exemplary configurations where a plurality of vertically-elongated slit-like scattering regions 31 are horizontally arranged in parallel. In the exemplary configuration shown in (A) and (B) of FIG. 34, each scattering region 31 entirely has a structure as shown in one of FIGS. 6A and 6B to 8A and 8B, for example. In the exemplary configuration shown in (A) and (B) of FIG. 35, each of the plurality of scattering portions 36 in one scattering region 31 has a structure as shown in one of FIGS. 6A and 6B to 8A and 8B, for example. The plurality of scattering portions 36 are densely disposed in one scattering region 31, resulting in an optical function generally equivalent to that of the configuration shown in (A) and (B) of FIG. 34. It is to be noted that although (A) of FIG. 35 shows the scattering portions 36 each having a circular planar shape, this is not limitative. The planar shape may include various other shapes such as an ellipse, a triangle, and a polygon. In addition, the scattering portions 36 in one scattering region 31 are not limited to one shape and one size, but may mixedly have a variety of shapes and sizes.

[Basic Operation of Display]

In the display, for display in the three-dimensional display mode, the display section 1 displays images based on three-dimensional image data, and the first and second light sources 2 and 7 are each controlled to be on (lit) or off (unlit) for three-dimensional display. In detail, the first light sources 2 are controlled to be on (lit), and the second light source 7 is controlled to be off (unlit), as shown in FIG. 1. In this state, the first illumination light L1 from the first light sources 2 is repeatedly internally total-reflected between the first internal reflection face 3A and the total reflection regions 32 of the second internal reflection face 3B in the light guide plate 3, thereby the first illumination light L1 is guided from a first side face, on which one of the first light sources 2 is disposed, to an opposite second side face, and output through the second side face. In addition, part of the first illumination light L1 from the first light source 2 is scatter-reflected by the scattering regions 31 of the light guide plate 3 and thus transmitted by the first internal reflection face 3A of the light guide plate 3, and output to the outside of the light guide plate 3. This enables the light guide plate 3 itself to function as the parallax barrier. Specifically, the light guide plate 3 itself is allowed to equivalently function as the parallax barrier where the scattering regions 31 act as the openings (slit portions) and the total reflection regions 32 act as the light-shielding portions for the first illumination light L1 from the first light source 2. This results in equivalent three-dimensional display in the parallax barrier type where the parallax barrier is disposed close to the back of the display section 1.

In contrast, for display in the two-dimensional display mode, the display section 1 displays images based on two-dimensional image data, and each of the first and second light sources 2 and 7 is controlled to be on (lit) or off (unlit) for two-dimensional display. In detail, the first light sources 2 are controlled to be off (unlit), and the second light source 7 is controlled to be on (lit), for example, as shown in FIG. 2. In this case, the second illumination light L10 from the second light source 7 passes through the total reflection regions 32 of the second internal reflection face 3B, and thus is output to the outside of the light guide plate 3 through substantially the entire first internal reflection face 3A as light rays that do not satisfy the total reflection condition. Specifically, the light guide plate 3 functions as a planar light source similar to a typical backlight. This results in equivalent two-dimensional display in the backlight type where the typical backlight is disposed close to the back of the display section 1.

It is to be noted that although the second illumination light L10 is output from substantially the entire surface of the light guide plate 3 through lighting of only the second light source 7, the first light sources 2 are also allowed to be lit as shown in FIG. 3 as necessary. Consequently, for example, if luminance distribution is different between the portions corresponding to the scattering regions 31 and the portions corresponding to the total reflection regions 32 through lighting of only the second light source 7, the luminance distribution is optimized over the entire surface through appropriate adjustment of a lighting state of the first light sources 2 (on/off control or adjustment of a lighting level). However, in the case of two-dimensional display, for example, if the display section 1 corrects luminance well, only the second light source 7 needs to be lit.

[Correspondence Relationship Between Assignment Pattern of Perspective Images and Arrangement Pattern of Scattering Regions 31]

In the display, the display section 1 displays a plurality of perspective images while assigning the perspective images to each pixel in a predetermined pattern for display in the three-dimensional display mode. The plurality of scattering regions 31 in the light guide plate 3 are provided in a predetermined arrangement pattern corresponding to the predetermined assignment pattern.

Hereinafter, specific examples of a correspondence relationship between the assignment pattern of perspective images and the arrangement pattern of the scattering regions 31 are described. In a pixel structure of the display section 1, a plurality of pixels each including a red sub-pixel 11R, green sub-pixel 11G, and blue sub-pixel 11B are provided, and the plurality of pixels are arranged in a matrix in a first direction (vertical direction) and a second direction (horizontal direction), as shown in FIG. 9. Three-color sub-pixels 11R, 11G, and 11B are arranged periodically and alternately in the horizontal direction, and one-color sub-pixels 11R, 11G, or 11B are arranged in the vertical direction. In this pixel structure, for image display of typical two-dimensional images on the display section 1 (the two-dimensional display mode), a combination of the horizontally continuous three-color sub-pixels 11R, 11G, and 11B define one pixel for two-dimensional color display (one unit pixel for 2D color display). FIG. 9 illustrates the unit pixels for 2D color display by six in the horizontal direction and by three in the vertical direction. (Specific Example of Two-Eyepoint Display)

(A) of FIG. 10 illustrates an exemplary correspondence relationship between the assignment pattern of perspective images in assignment of two perspective images (first and second perspective images) to each pixel of the display section 1 and the arrangement pattern of the scattering regions 31 in the pixel structure shown in FIG. 9. (B) of FIG. 10 illustrates a section along a line A-A' in (A) of FIG. 10. (B) of FIG. 10 schematically illustrates a separated state of the two perspective images. In this exemplary correspondence relationship, the one unit pixel for 2D color display is assigned as one pixel for display of one perspective image. In addition, the pixels are assigned such that the first and second perspective images are alternately displayed in a horizontal direction. Consequently, a horizontal combination of two unit pixels for 2D color display defines one unit image (one stereoscopic pixel) for three-dimensional display. As shown in (B) of FIG. 10, the first perspective image reaches only a right eye 10R of a viewer, and the second perspective image reaches only a left eye 10L of the viewer, leading to stereoscopy. In the exemplary correspondence relationship, the pixels are arranged such that a horizontal position of each scattering region 31 corresponds to substantially the center of the one unit image for three-dimensional display.

The horizontal width D1 of each scattering region 31 has a predetermined relationship to the width D2 of one pixel for display of one perspective image. In detail, the width D1 of the scattering region 31 is preferably from 0.2 times to 1.5 times as large as the width D2. As the width D1 of the scattering region 31 increases, the amount of light scattered by the scattering region 31 increases, resulting in an increase in the amount of light output from the light guide plate 3. As a result, luminance is increased. However, if the width D1 of the scattering region 31 is more than 1.5 times as large as the width D2, light rays from a plurality of perspective images are undesirably mixedly viewed, or so-called crosstalk occurs. Contrarily, as the width D1 of the scattering region 31 decreases, the amount of light scattered by the scattering region 31 decreases, resulting in a decrease in the amount of light output from the light guide plate 3. As a result, luminance decreases. If the width D1 of the scattering region 31 is less than 0.2 times as large as the width D2, luminance undesirably extremely decreases, leading to extremely dark image display.

Moreover, the height (depth) H1 of the scattering region 31 with respect to the surface (the second internal reflection face 3B in this embodiment) of the light guide plate has a predetermined relationship to the width D1 of the scattering region 31. In detail, the following predetermined condition (1A) is preferably satisfied. Specifically, the height (depth) H1 is preferably smaller than twice the width D1 of the scattering region 31. More preferably, the following condition (1B) is satisfied. Specifically, the height (depth) H1 is more preferably from 0.2 times to 0.5 times as large as the width D1 of the scattering region 31. It is to be noted that the height H1 refers to a height in a direction from the surface of the light guide plate to the inside thereof in the case of the concave scattering region 31A as shown in FIG. 6A. The height H1 refers to a height in a direction from the surface of the light guide plate to the outside thereof in the case of the convex scattering region 31B as shown in FIG. 7A or the print-patterned scattering region 31C as shown in FIG. 8A.

$$0 < H1 < 2*D1 \quad (1A)$$

$$0.2*D1 \leq H1 \leq 0.5*D1 \quad (1B)$$

Herein, the height H1 of the scattering region 31 refers to a height of the entire scattering portion in the case where one scattering region 31 is entirely configured as a scattering portion as shown in (A) and (B) of FIG. 34. The height H1 refers to a height of each of a plurality of scattering portions 36 in the case where one scattering region 31 has the plurality of scattering portions 36 as shown in (A) and (B) of FIG. 35. The same is true on other specific examples described below.

FIG. 17A illustrates luminance distribution in the Y direction in the case where only the first light sources 2 are on (lit) in the light source device shown in FIG. 1. FIG. 17B corresponds to a plan view of the light source device shown in FIG. 1. FIG. 17C corresponds to a diagram of the light source device shown in FIG. 1 as viewed from an X direction. In the exemplary configuration shown in the diagrams, the first light sources 2 are disposed on side faces different from those in the exemplary configuration shown in FIG. 1. However, if an arrangement direction of the first light sources 2 is the same as in FIG. 1, the following difficulty, namely non-uniformity of luminance, also occurs depending on the arrangement direction. In this light source device, in the case where only the first light sources 2 are on (lit), luminance of light output from the light guide plate 3 tends to be distributed such that luminance is relatively high with decreasing distance from the predetermined side face where each first light source 2 is disposed while being relatively low with increasing distance from the predetermined side face as shown in FIG. 7A. In the exemplary configuration shown in FIGS. 17B and 17C, the first light sources 2 are disposed on the two side faces in the vertical (Y) direction; hence, luminance is relatively high at a position closer to each of the two side faces in the Y direction while being relatively lowest at the center in the Y direction between the two predetermined side faces. Ideally, the luminance distribution is preferably flat regardless of positions as shown in FIG. 17A. FIG. 17A shows tendencies of luminance distribution for heights H1 of 0.2 times, 0.6 times, and 1.0 times as large as the width D1 of the scattering region 31. FIG. 17A reveals that luminance distribution becomes less uniform as the height H1 increases with respect to the width D1 of the scattering region 31. From the viewpoint of uniformity of luminance distribution, the above-described condition 1A is preferably satisfied, and more preferably the condition 1B is satisfied. Satisfying the condition 1A enables recognition of images for stereoscopic display. Satisfying the condition 1B enables high luminance and a reduction in unevenness of luminance, leading to good viewing situation.

(Specific Example of Three-Eyepoint Display)

(A) of FIG. 11 illustrates a first exemplary correspondence relationship between the assignment pattern of perspective images in assignment of three perspective images (first to third perspective images) to each pixel of the display section 1 and the arrangement pattern of the scattering regions 31 in the pixel structure shown in FIG. 9. (B) of FIG. 11 illustrates a section along a line A-A' in (A) of FIG. 11. (B) of FIG. 11 schematically illustrates a separated state of the three perspective images. In this exemplary correspondence relationship, the one unit pixel for 2D color display is assigned as one pixel for display of one perspective image. In addition, the pixels are assigned such that the first to third perspective images are alternately displayed in a horizontal direction. Consequently, a horizontal combination of three unit pixels for 2D color display defines one unit image (one stereoscopic pixel) for three-dimensional display. As shown in (B) of FIG. 11, one of the first to third perspective images reaches only a right eye 10R of a viewer, and another one of the perspective images reaches only a left eye 10L of the viewer, leading to stereoscopy. In this exemplary correspondence relationship, the pixels are arranged such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably the condition 1B.

(A) of FIG. 12 illustrates a second exemplary correspondence relationship between the assignment pattern of perspective images in assignment of three perspective images (first to third perspective images) to each pixel of the display section 1 and the arrangement pattern of the scattering regions 31 in the pixel structure shown in FIG. 9. (B) of FIG. 12 illustrates a section along a line A-A' in (A) of FIG. 12. (B) of FIG. 12 schematically illustrates a separated state of the three perspective images. In this exemplary correspondence relationship, an oblique combination of the red sub-pixel 11R, the green sub-pixel 11G, and the blue sub-pixel 11B is assigned as one pixel for display of one perspective image. In addition, the pixels are assigned such that the first to third perspective images are alternately displayed at a predetermined inclination. The perspective images are assigned in both horizontal and vertical directions in comparison with the case shown in (A) and (B) of FIG. 11. As shown in (B) of FIG. 12, one of the first to third perspective images reaches only a right eye 10R of a viewer, and another one of the perspective images reaches only a left eye 10L of the viewer, leading to stereoscopy. In this exemplary correspondence relationship, pixels are obliquely arranged at a predetermined inclination such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably the condition 1B. It is to be noted that the width D2 of one pixel for display of one perspective image corresponds to a width of the red sub-pixel 11R, the green sub-pixel 11G, or the blue sub-pixel 11B.

(Specific Example of Four-Eyepoint Display)

(A) of FIG. 13 illustrates a first exemplary correspondence relationship between the assignment pattern of perspective images in assignment of four perspective images (first to fourth perspective images) to each pixel of the display section 1 and the arrangement pattern of the scattering regions 31 in the pixel structure shown in FIG. 9. (B) of FIG. 13 illustrates a section along a line A-A' in (A) of FIG. 13. (B) of FIG. 13 schematically illustrates a separated state of the four perspective images. In this exemplary correspondence relationship, the one unit pixel for 2D color display is assigned as one pixel for display of one perspective image. In addition, the pixels are assigned such that the first to fourth perspective images are alternately displayed in a horizontal direction. Consequently, a horizontal combination of four unit pixels for 2D color display defines one unit image (one stereoscopic pixel) for three-dimensional display. As shown in (B) of FIG. 13, one of the first to fourth perspective images reaches only a right eye 10R of a viewer, and another one of the perspective images reaches only a left eye 10L of the viewer, leading to stereoscopy. In this exemplary correspondence relationship, the pixels are arranged such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably the condition 1B.

(A) of FIG. 14 illustrates a second exemplary correspondence relationship between the assignment pattern of perspective images in assignment of four perspective images (first to fourth perspective images) to each pixel of the display section 1 and the arrangement pattern of the scattering regions 31 in the pixel structure shown in FIG. 9. (B) of FIG. 14 illustrates a section along a line A-A' in (A) of FIG. 14. (B) of FIG. 14 schematically illustrates a separated state of the four perspective images. In this example, an oblique combination of the red sub-pixel 11R, the green sub-pixel 11G, and the blue sub-pixel 11B is assigned as one pixel for display of one perspective image. In addition, the pixels are assigned such that the first to fourth perspective images are alternately displayed at a predetermined inclination. The perspective images are assigned in both horizontal and vertical directions in comparison with the case shown in (A) and (B) of FIG. 13. As shown in (B) of FIG. 14, one of the first to fourth perspective images reaches only a right eye 10R of a viewer, and another one of the perspective images reaches only a left eye 10L of the viewer, leading to stereoscopy. In this exemplary correspondence relationship, the pixels are obliquely arranged at a predetermined inclination such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably, the condition 1B. It is to be noted that the width D2 of one pixel for display of one perspective image corresponds to a width of the red sub-pixel 11R, the green sub-pixel 11G, or the blue sub-pixel 11B.

(A) of FIG. 15 illustrates a third exemplary correspondence relationship between the assignment pattern of perspective images in assignment of four perspective images (first to fourth perspective images) to each pixel of the display section 1 and the arrangement pattern of the scattering regions 31 in the pixel structure shown in FIG. 9. (B) of FIG. 15 illustrates a section along a line A-A' in (A) of FIG. 15. (B) of FIG. 15 schematically illustrates a separated state of the four perspective images. In this exemplary correspondence relationship, a triangular combination of the red sub-pixel 11R, the green sub-pixel 11G, and the blue sub-pixel 11B is assigned as one pixel for display of one perspective image. In addition, the pixels are assigned such that the first to fourth perspective images are alternately displayed in a triangular shape. The perspective images are assigned in both horizontal and vertical directions in comparison with the case shown in (A) and (B) of FIG. 13. As shown in (B) of FIG. 15, one of the first to fourth perspective images reaches only a right eye 10R of a viewer, and another one of the perspective images reaches only a left eye 10L of the viewer, leading to stereoscopy. In this exemplary correspondence relationship, pixels are disposed at points corresponding to apexes of the triangular shape such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably, the condition 1B. It is to be noted that the width D2 of one pixel for display of one perspective image corresponds to a width of the red sub-pixel 11R, the green sub-pixel 11G, or the blue sub-pixel 11B.

(Second Example of Pixel Structure of Display Section 1)

FIG. 16A illustrates a second example of the pixel structure of the display section 1. In this pixel structure, three-color sub-pixels 11R, 11G, and 11B are arranged periodically and alternately in the vertical direction, and one-color sub-pixels 11R, 11G, or 11B are arranged in the horizontal direction. In this pixel structure, for image display of typical two-dimensional images on the display section 1 (the two-dimensional display mode), a combination of the vertical three-color sub-pixels 11R, 11G, and 11B define one pixel for two-dimensional color display (one unit pixel for 2D color display). FIG. 16A illustrates the unit pixels for 2D color display by 18 in the horizontal direction and by one in the vertical direction.

FIG. 16B illustrates an exemplary correspondence relationship between the assignment pattern of perspective images in assignment of two perspective images (first and second perspective images) to each pixel of the display section 1 and the arrangement pattern of the scattering regions 31 in the pixel structure shown in FIG. 16A. In this exemplary correspondence relationship, the one unit pixel for 2D color display is assigned as one pixel for display of one perspective image. In addition, the pixels are assigned such that the first and second perspective images are alternately displayed in the horizontal direction. Consequently, a horizontal combination of two unit pixels for 2D color display defines one unit image (one stereoscopic pixel) for three-dimensional display. In this example, the pixels are arranged such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition 1A, more preferably the condition 1B.

[Effect]

As described above, according to the display of the embodiment, the scattering regions 31 and the total reflection regions 32 are provided on the second internal reflection face 3B of the light guide plate 3, and the first illumination light from the first light source 2 and the second illumination light L10 from the second light source 7 are selectively output to the outside of the light guide plate 3. As a result, the light guide plate 3 itself equivalently functions as the parallax barrier. Consequently, the number of components is reduced compared with the stereoscopic display of the parallax barrier type in the past, leading to space-saving.

2. Modifications of First Embodiment

The modifications are described with exemplary structures of the scattering regions 31 which achieve improvement in luminance distribution.

[Relationship Between Height (Depth) of Scattering Region 31 and Luminance]

FIGS. 18 and 19 illustrate luminance distribution in the Y direction (first direction, vertical direction in a plane) and in the X direction (second direction, horizontal direction in a plane), respectively, in the case where only the first light sources 2 are on (lit) in the light source device shown in FIG. 1. In the description, the display section 1 has the pixel structure as shown in FIG. 9, and an arrangement pattern of the scattering regions 31 is, for example, as shown in (A) and (B) of FIG. 10.

FIG. 18 illustrates a plan view of the light source device and a side view thereof as viewed from the X direction, in addition to luminance distribution. FIG. 18 also illustrates height (depth) distribution in the Y direction of the scattering regions 31. FIG. 18 illustrates luminance distribution in the case where the first light sources 2 are disposed on first and second side faces opposed to each other in the Y direction. A plurality of scattering regions 31 extend in the Y direction and arranged side by side in the X direction between the first and second side faces. A height (depth) H1 of each scattering region 31 with respect to the surface (the second internal reflection face 3B in this embodiment) of the light guide plate is even over the entire surface. In such a configuration where the first light sources 2 are oppositely disposed in the Y direction, and depth distribution of the scattering regions 31 is uniform over the entire surface, luminance of light output from the light guide plate 3 tends to be distributed in the Y direction such that luminance is relatively high with decreasing distance from each of the predetermined side faces (the first and second side faces) where the first light sources 2 are disposed, while being relatively low with increasing distance from each of the predetermined side faces. In the exemplary structure shown in FIG. 18, the first light sources 2 are disposed on the two predetermined side faces in the Y direction; hence, luminance is relatively high at a position closer to each of the two predetermined side faces in the Y direction while being relatively lowest at the center in the Y direction between the two predetermined side faces. In contrast, luminance distribution in the X direction is constant regardless of positions.

FIG. 19 illustrates a plan view of the light source device and a side view thereof as viewed from the Y direction, in addition to luminance distribution. FIG. 19 also illustrates height (depth) distribution in the Y direction of the scattering regions 31. FIG. 19 illustrates luminance distribution in the case where the first light sources 2 are disposed on third and fourth side faces opposed to each other in the X direction. The height (depth) H1 of each scattering region 31 with respect to the surface of the light guide plate is even over the entire surface. In such a configuration where the first light sources 2 are disposed in the X direction, and depth distribution of the scattering region 31 is uniform over the entire surface, luminance of light output from the light guide plate 3 tends to be distributed in the X direction such that luminance is relatively high with decreasing distance from each of the predetermined side faces (the third and fourth side faces) where the first light sources 2 are disposed, while being relatively low with increasing distance from each of the predetermined side faces. In the exemplary structure shown in FIG. 19, the first light sources 2 are disposed on the two predetermined side faces in the X direction; hence, luminance is relatively high at a position closer to each of the two predetermined side faces in the X direction while being relatively lowest at the center in the X direction between the two predetermined side faces. In contrast, luminance distribution in the Y direction is constant regardless of positions.

As shown in FIGS. 18 and 19, luminance distribution is partially lowered depending on the disposed positions of the first light sources 2 and the height (depth) H1 of the scattering region 31, leading to unevenness of luminance. Ideally, the luminance distribution is preferably flat regardless of positions in both the X and Y directions.

A method of improving the above-described luminance distribution is now described with reference to FIGS. 20 to 22. It is to be noted that while an exemplary case where the first light sources 2 are disposed in the Y direction is described with reference to FIGS. 20 to 22, luminance distribution is also improved by the similar method even if they are disposed in the X direction.

To improve the luminance distribution, the light source device needs to have a structure where the height (depth) H1 of the scattering region 31 is varied depending on a distance from each of the predetermined side faces where the first light sources 2 are disposed, and the height H1 decreases with decreasing distance from the predetermined side face of the light guide plate 3. It is to be noted that the height (depth) H1 of the scattering region 31 described herein refers to a height in a direction from the surface of the light guide plate to the inside thereof in the case of the concave scattering region 31A as shown in FIG. 6A. In addition, the height H1 refers to a height in a direction from the surface of the light guide plate to the outside thereof in the case of the convex scattering region 31B as shown in FIG. 7A or the print-patterned scattering region 31C as shown in FIG. 8A.

FIG. 20 illustrates an example of improvement in luminance distribution through a structure of the scattering region 31, where the height (depth) H1 decreases with decreasing distance from each of the two predetermined side faces in the Y direction of the light guide plate 3, and increases with decreasing distance from the center between the two predetermined side faces. In a first example shown in FIG. 20, the height (depth) H1 of each scattering region 31 is continuously varied at a constant rate. However, the height (depth) H1 need not be necessarily varied at a constant rate, and may be varied such that depth distribution is curved, for example, as shown in a second example illustrated in FIG. 21.

Although the scattering regions 31 are structured such that the height (depth) H1 continuously varies depending on the distance from each of the two predetermined side faces in the examples shown in FIGS. 20 and 21, the scattering regions 31 may be structured such that the height (depth) H1 varies stepwise depending on the distance from each of the two predetermined side faces as shown in FIG. 22.

[Relationship Between Length of Scattering Region 31 and Luminance]

While luminance distribution has been described in terms of the height (depth) of the scattering region 31 with reference to FIGS. 18 to 22, it is now described in terms of length of the scattering region 31 with reference to FIGS. 23 to 26.

FIGS. 23 and 24 illustrate luminance distribution in the Y direction (first direction, vertical direction in a plane) and in the X direction (second direction, horizontal direction in a plane) in the case where only the first light sources 2 are on (lit) in the light source device shown in FIG. 1. It is to be noted that FIGS. 23 and 24 exemplifies a case where the number of eyepoints is four.

FIG. 23 illustrates a plan view of the light source device and a side view thereof as viewed from the X direction, in addition to luminance distribution. FIG. 23 illustrates luminance distribution in the case where the first light sources 2 are disposed on first and second side faces opposed to each other in the Y direction. FIG. 23 also illustrates length distribution in the Y direction of the scattering regions 31. A plurality of scattering regions 31 extend in the Y direction and arranged side by side in the X direction between the first and second side faces. The length distribution of each scattering region 31 shown in FIG. 23 shows relative length of the scattering region 31 to each of the sub-pixels 11R, 11G, and 11B. In the example shown in FIG. 23, relative length of the scattering region 31 to each of the sub-pixels 11R, 11G, and 11B is constant. The height (depth) H1 of each scattering region 31 with respect to the surface (the second internal reflection face 3B in the embodiment) of the light guide plate is even over the entire surface. In such a configuration where the first light sources 2 are disposed in the Y direction, and depth distribution and length distribution of the scattering regions 31 are uniform over the entire surface, luminance of light output from the light guide plate 3 tends to be distributed in the Y direction such that luminance is relatively high with decreasing distance from each of the predetermined side faces (the first and second side faces) where the first light sources 2 are disposed, while being relatively low with increasing distance from each of the predetermined side faces. In the example shown in FIG. 23, the first light sources 2 are disposed on the two predetermined side faces in the Y direction; hence, luminance is relatively high at a position closer to each of the two predetermined side faces in the Y direction while being relatively lowest at the center in the Y direction between the predetermined two side faces. In contrast, luminance distribution in the X direction is constant regardless of positions.

FIG. 24 illustrates a plan view of the light source device and a side view thereof as viewed from the Y direction, in addition to luminance distribution. FIG. 24 illustrates luminance distribution in the case where the first light sources 2 are disposed on third and fourth side faces opposed to each other in the X direction. FIG. 24 also illustrates length distribution in the Y direction of the scattering regions 31. The structure of the scattering regions 31 is the same as in the example shown in FIG. 23, where relative length of each scattering region 31 to each of the sub-pixels 11R, 11G, and 11B is constant. The height (depth) H1 of the scattering region 31 with respect to the surface of the light guide plate is even over the entire surface. In such a configuration where the first light sources 2 are disposed in the X direction, and depth distribution and length distribution of the scattering regions 31 are uniform over the entire surface, luminance of light output from the light guide plate 3 tends to be distributed in the X direction such that luminance is relatively high with decreasing distance from each of the predetermined side faces (the third and fourth side faces) where the first light sources 2 are disposed, while being relatively low with increasing distance from each of the predetermined side faces. In the example shown in FIG. 24, the first light sources 2 are disposed on the two predetermined side faces in the X direction; hence, luminance is relatively high at a position closer to each of the two predetermined side faces in the X direction while being relatively lowest at the center in the X direction between the two predetermined side faces. In contrast, luminance distribution in the Y direction is constant regardless of positions.

A method of improving luminance distribution for the structures shown in FIGS. 23 and 24 is now described with reference to FIGS. 25 and 26. In the examples shown in FIGS. 20 to 22, the height (depth) H1 of each scattering region 31 is varied depending on a distance from each of the predetermined side faces where the first light sources 2 are disposed. In the examples shown in FIGS. 25 and 26, relative length of the scattering region 31 to each of the sub-pixels 11R, 11G, and 11B is varied to improve luminance distribution. In FIGS. 25 and 26, each scattering region 31 does not continue in the Y direction, but is partitioned in order to vary the length of the scattering region 31 to each of the sub-pixels 11R, 11G, and 11B.

FIG. 25 illustrates an example of improvement in luminance distribution for the structure shown in FIG. 23. In the example shown in FIG. 25, relative length of the scattering region 31 to each of the sub-pixels 11R, 11G, and 11B is smaller (shorter) with decreasing distance from each of the two predetermined side faces in the Y direction of the light guide plate 3, while being larger (longer) with decreasing distance from the center between the two predetermined side faces. In the example shown in FIG. 25, the length of each scattering region 31 is varied at a constant rate. However, the length need not be necessarily varied at a constant rate, and may be varied such that length distribution is curved, for example, as in the example of depth distribution shown in FIG. 21.

FIG. 26 illustrates an example of improvement in luminance distribution for the structure shown in FIG. 24. In the example shown in FIG. 26, relative length of the scattering region 31 to each of the sub-pixels 11R, 11G, and 11B is smaller (shorter) with decreasing distance from each of the two predetermined side faces in the X direction of the light guide plate 3 while being larger (longer) with decreasing distance from the center between the two predetermined side faces. In the example shown in FIG. 26, the length of each scattering region 31 is varied at a constant rate. However, the length need not be necessarily varied at a constant rate, and may be varied such that length distribution is curved, for example, as in the example of depth distribution shown in FIG. 21.

While description has been made with the example where one of the height and length of the scattering regions 31 is varied to improve luminance distribution hereinbefore, both the height and the length may be optimized to change the entire configuration of the scattering regions 31.

3. Second Embodiment

A display according to a second embodiment of the disclosure is now described. It is to be noted that substantially the same components as those of the display according to the first embodiment are designated by the same numerals, and description of them is appropriately omitted.

[Overall Configuration of Display]

While the first embodiment has been described with the exemplary configuration where the scattering regions 31 and the total reflection regions 32 are provided on the second internal reflection face 3B of the light guide plate 3, they may be provided on the first internal reflection face 3A.

FIGS. 27A and 27B illustrate an exemplary configuration of a display according to a second embodiment of the disclosure. The display is appropriately selectively switched between the two-dimensional display mode and the three-dimensional display mode, as in the display shown in FIG. 1. FIG. 27A illustrates a configuration in the three-dimensional display mode, and FIG. 27B illustrates a configuration in the two-dimensional display mode. FIGS. 27A and 27B also schematically illustrate light rays output from a light source device in the respective display modes.

A second internal reflection face 3B is entirely mirror-finished, and thus internally totally reflects first illumination light L1 incident at an angle $\theta 1$ that satisfies a total reflection condition. A first internal reflection face 3A has scattering regions 31 and total reflection regions 32. On the first internal reflection face 3A, the total reflection regions 32 and the scattering regions 31 are alternately provided in a stripe pattern, for example, so as to be formed into a structure corresponding to the parallax barrier. Specifically, they are structured such that the scattering regions 31 function as openings (slit portions) as the parallax barrier, and the total reflection regions 32 function as the light-shielding portions during the three-dimensional display mode, as described below.

The total reflection regions 32 internally totally reflect first illumination light L1 incident at an angle θ1 that satisfies a total reflection condition (internally totally reflect the first illumination light L1 incident at an angle θ1 larger than a predetermined critical angle). The scattering regions 31 output part or all of incident light rays L2, which are incident at an angle corresponding to the incident angle θ1 that satisfies the predetermined total reflection condition on the total reflection regions 32, (outputs part or all of the light rays incident at the angle corresponding to the incident angle θ1 larger than the predetermined critical angle α). In addition, the scattering regions 31 internally reflect other part of the incident light rays L2.

In the display shown in FIG. 27A, pixels of the display section 1 and the scattering regions 31 of the light guide plate 3 need to be disposed opposite to each other with a predetermined distance d therebetween for spatial separation of the plurality of perspective images displayed on the display section 1. In FIG. 27A, a spacer 8 is disposed between the display section 1 and the light guide plate 3. The spacer 8 may include any material that is colorless, transparent, and weakly light-scatterable, for example, PMMA. The spacer 8 may be provided to entirely cover the back of the display section 1 and a front surface of the light guide plate 3, or may be partially provided to the minimum necessary to maintain the predetermined distance d.

[Specific Exemplary Configuration of Scattering Region 31]

FIG. 28A illustrates a first exemplary configuration of the surface of the light guide plate 3. FIG. 28B schematically illustrates a reflecting state and a scattering state of light rays on the surface of the light guide plate 3 shown in FIG. 28A. In the first exemplary configuration, the scattering regions 31 are formed as scattering regions 31A that are concave with respect to the total reflection regions 32. Such concave scattering regions 31A are formed by, for example, mirror-finishing of the surface of the light guide plate 3 and then laser processing of corresponding portions. In each of the concave scattering regions 31A, part or all of the incident light rays, which are incident at an angle corresponding to the incident angle θ1 that satisfies the predetermined total reflection condition on the total reflection region 32, do not satisfy the total reflection condition on a side face portion 33 of the concave scattering region 31A, and are output to the outside.

FIG. 29A illustrates a second exemplary configuration of the surface of the light guide plate 3. FIG. 29B schematically illustrates a reflecting state and a scattering state of light rays on the surface of the light guide plate 3 shown in FIG. 29A. In the second exemplary configuration, the scattering regions 31 are formed as scattering regions 31A that are convex with respect to the total reflection regions 32. Such convex scattering regions 31B are formed by, for example, processing of the surface of the light guide plate 3 through die molding. In such a case, the portions corresponding to the total reflection regions 32 are mirror-finished with the surface of a die. In the convex scattering region 31B, part or all of the incident light rays, which are incident at an angle corresponding to the incident angle θ1 that satisfies the predetermined total reflection condition on the total reflection region 32, do not satisfy the total reflection condition at a side face portion 34 of the convex scattering region 31A, and are output to the outside.

FIG. 30A illustrates a third exemplary configuration of the surface of the light guide plate 3. FIG. 30B schematically illustrates a reflecting state and a scattering state of light rays on the surface of the light guide plate 3 shown in FIG. 30A. In the exemplary configurations shown in FIGS. 28A and 29A, each scattering region 31 is formed through processing of the surface of the light guide plate 3 into a shape different from the total reflection region 32. In contrast, in the exemplary configuration shown in FIG. 30A, each scattering region 31C is formed by disposing a light scattering member 35 on the surface of the light guide plate 3 corresponding to the first internal reflection face 3A, instead of surface processing. The light scattering member 35 may include materials having a refractive index equal to or larger than that of the light guide plate 3, for example, polyethylene terephthalate (PET) resin having a refractive index of about 1.57. For example, a diffuser sheet formed of the PET resin is attached to the surface of the light guide plate 3 with an acrylic adhesive, thereby the scattering regions 31C are formed. In each scattering region 31C formed by disposing the light scattering member 35, part or all of the incident light rays, which are incident at an angle corresponding to the incident angle θ1 that satisfies the predetermined total reflection condition on the total reflection region 32, do not satisfy the total reflection condition due to a change in the refractive index of the light rays by the light scattering member 35, and are output to the outside.

The scattering regions 31 may include other exemplary configurations without being limited to the above-described exemplary configurations. For example, the portions corresponding to the scattering regions 31 in the surface of the light guide plate 3 are formed by sandblasting or coating. In addition, while FIGS. 28A and 29A exemplify the scattering regions 31 (the scattering regions 31A and 31B) each having a trapezoidal sectional shape, this is not limitative. Various other sectional shapes such as semicircular and polygonal shapes are allowed to be used.

The plurality of scattering regions 31 may be configured such that each scattering region 31 is entirely formed as a scattering portion (see (A) and (B) of FIG. 34), or may be configured such that a plurality of scattering portions 36 are provided in one scattering region 31 (see (A) and (B) of FIG. 35), as in the first embodiment.

[Basic Operation of Display]

In the display, for display in the three-dimensional display mode (FIG. 27A), the display section 1 displays images based on three-dimensional image data, and the second light source 7 is entirely off (unlit). The first light sources 2 disposed on the side faces of the light guide plate 3 are on (lit). In this state, the first illumination light L1 from the first light sources 2 is repeatedly internally total-reflected between the total reflection regions 32 of the first internal reflection face 3A and the second internal reflection face 3B in the light guide plate 3, thereby the first illumination light L1 is guided from a first side face, on which one of the first light sources 2 is disposed, to an opposite second side face, and output through the second side face. In addition, in the light guide plate 3, of light rays L2 which have entered the scattering regions 31 of the first internal reflection face 3A, a part of the light rays that does not satisfy the total reflection condition is output to the outside through the scattering regions 31. In addition, the scattering regions 31 internally reflect other partial light rays that are then output to the outside through the second internal reflection face 3B of the light guide plate 3, and thus do not contribute to image display. As a result, in the light guide plate 3, light rays are output from the first internal reflection face 3A only through the scattering regions 31. Specifically, the surface of the light guide plate 3 equivalently functions as the parallax barrier where the scattering regions 31 act as the openings (slit portions) and the total reflection regions 32 act as the light-shielding portions. This results in equivalent three-dimensional display of the parallax barrier type where the parallax barrier is disposed close to the back of the display section 1.

In contrast, for display in the two-dimensional display mode (FIG. 27B), the display section 1 displays images based on two-dimensional image data, and the second light source 7 is entirely on (lit). The first light sources 2 disposed on the side faces of the light guide plate 3 are unlit, for example. In this state, the second illumination light L10 from the second light source 7 substantially perpendicularly enters the light guide plate 3 through the second internal reflection face 3B. Consequently, the incident angle of the light rays of the second illumination light L10 does not satisfy the total reflection condition on the total reflection regions 32, and thus is output to the outside not only through the scattering regions 31 but also through the total reflection regions 32. As a result, the light rays are output through the entire surface of the first internal reflection face 3A in the light guide plate 3. Specifically, the light guide plate 3 functions as a planar light source similar to a typical backlight. This results in equivalent two-dimensional display in the backlight type where the typical backlight is disposed close to the back of the display section 1.

It is to be noted that the first light sources 2 disposed on the side faces of the light guide plate 3 may be controlled to be on (lit) together with the second light source 7, for display in the two-dimensional display mode. In addition, the first light sources 2 may be switched to be unlit or lit as necessary, for display in the two-dimensional display mode. Consequently, for example, if luminance distribution is different between the scattering regions 31 and the total reflection regions 32 in the case of lighting of only the second light source 7, the luminance distribution is optimized over the entire surface through appropriate adjustment of a lighting state of the first light sources 2 (on/off control or adjustment of a lighting level).

[Correspondence Relationship Between Assignment Pattern of Perspective Images and Arrangement Pattern of Scattering Regions 31]

In the display, the display section 1 displays a plurality of perspective images while assigning the perspective images to each pixel in a predetermined pattern, for display in the three-dimensional display mode. The plurality of scattering regions 31 in the light guide plate 3 are arranged in a predetermined arrangement pattern corresponding to the predetermined assignment pattern.

(A) of FIG. 31 illustrates an exemplary correspondence relationship between the assignment pattern of perspective images in assignment of two perspective images (first and second perspective images) to each pixel of the display section 1 and the arrangement pattern of the scattering regions 31, in an overall configuration shown in FIG. 27A with the pixel structure shown in FIG. 9. (B) of FIG. 31 illustrates a section along a line A-A' in (A) of FIG. 31. (B) of FIG. 31 schematically illustrates a separated state of the two perspective images. In this exemplary correspondence relationship, the one unit pixel for 2D color display is assigned as one pixel for display of one perspective image. In addition, the pixels are assigned such that the first and second perspective images are alternately displayed in a horizontal direction. Consequently, a horizontal combination of two unit pixels for 2D color display defines one unit image (one stereoscopic pixel) for three-dimensional display. As shown in (B) of FIG. 31, the first perspective image reaches only a right eye 10R of a viewer, and the second perspective image reaches only a left eye 10L of the viewer, leading to stereoscopy. In this example, pixels are arranged such that a horizontal position of each scattering region 31 corresponds to substantially the center of the one unit image for three-dimensional display. The horizontal width D1 of each scattering region 31 has a predetermined relationship to the width D2 of one pixel for display of one perspective image, as in the case shown in (A) and (B) of FIG. 10. The height (depth) H1 of the scattering region 31 with respect to the surface of the light guide plate also preferably satisfies the above-described condition (1A), more preferably, the condition (1B).

The correspondence relationship between the assignment pattern and the arrangement pattern principally includes various other modes as in the first embodiment.

[Effect]

As described above, according to the display of the embodiment, the scattering regions 31 and the total reflection regions 32 are provided on the first internal reflection face 3A of the light guide plate 3, and the first illumination light from the first light sources 2 and the second illumination light L10 from the second light source 7 are selectively output to the outside of the light guide plate 3. As a result, the light guide plate 3 itself equivalently functions as the parallax barrier. Consequently, the number of components is reduced compared with the stereoscopic display of the parallax barrier type in the past, leading to space-saving.

4. Third Embodiment

A display according to a third embodiment of the disclosure is now described. It is to be noted that substantially the same components as those of the display according to the first or second embodiment are designated by the same numerals, and description of them is appropriately omitted.

[Overall Configuration of Display]

FIGS. 32A and 32B illustrate an exemplary configuration of a display according to a third embodiment of the disclosure. This display includes an electronic paper 4 in place of the second light source 7 of the display shown in FIGS. 27A and 27B.

The display is appropriately selectively switched between a full-screen two-dimensional (2D) display mode and a full-screen three-dimensional (3D) display mode. FIG. 32A illustrates a configuration in the three-dimensional display mode, and FIG. 32B illustrates a configuration in the two-dimensional display mode. FIGS. 32A and 32B each also schematically illustrate light rays output from light source devices in each display mode.

The electronic paper 4 is disposed opposite to the light guide plate 3 close to the second internal reflection face 3B. The electronic paper 4 is an optical device that is allowed to selectively switch modes of action on incident light rays between a light absorption mode and a scattering-reflection mode. The electronic paper 4 is composed of a particle-movement-type display such as an electrophoresis type display and a quick-response liquid powder type display. In the particle-movement-type display, for example, positively-charged black particles and negatively-charged white particles are dispersed between a pair of opposed substrates, and the black and white particles are moved depending on a voltage applied between the substrates, thereby achieving black or white display. Specifically, the particles are dispersed in a solution in the electrophoresis type display, while the particles are dispersed in a gas in the quick-response liquid powder type display. The above-described light absorption mode corresponds to a full-screen black display state of a display surface 41 of the electronic paper 4 as shown in FIG. 32A. The scattering-reflection mode corresponds to a full-screen white display state of the display surface 41 of the electronic paper 4 as shown in FIG. 32B. In the case where a display section 1 displays a plurality of perspective images based on three-dimensional image data (for the three-dimensional display mode), the electronic paper 4 is switched into the light absorption mode as the effect on the incident light rays. In the case where the display section 1 displays a plurality of images based on two-dimensional image data (for the two-dimensional display mode), the electronic paper 4 is switched into the scattering-reflection mode as the effect on the incident light rays.

In the display shown in FIGS. 32A and 32B, pixels of the display section 1 and scattering regions 31 of the light guide plate 3 need to be disposed opposite to each other with a predetermined distance therebetween for spatial separation of the plurality of perspective images displayed on the display section 1. Although an air gap is provided between the display section 1 and the light guide plate 3 in FIGS. 32A and 32B, a spacer 8 may be disposed between the display section 1 and the light guide plate 3 in order to maintain the predetermined distance d, as in the display shown in FIGS. 27A and 27B.

[Operation of Display]

In the display, for display in the three-dimensional display mode (FIG. 32A), the display section 1 displays images based on three-dimensional image data, while the display surface 41 of the electronic paper 4 is switched into the full-screen black display state (light absorption mode). In this state, first illumination light L1 from each first light source 2 is repeatedly internally total-reflected between total reflection regions 32 of a first internal reflection face 3A and a second internal reflection face 3B in the light guide plate 3, thereby the first illumination light L1 is guided from a first side face, on which one of the first light sources 2 is disposed, to an opposite second side face, and output through the second side face. In addition, in the light guide plate 3, of light rays L2 which have entered the scattering regions 31 of the first internal reflection face 3A, a part of light rays that does not satisfy the total reflection condition is output to the outside through the scattering regions 31. In addition, the scattering regions 31 internally reflect other partial light rays L3 that then enter the display surface 41 of the electronic paper 4 through the second internal reflection face 3B of the light guide plate 3. In this state, the display surface 41 of the electronic paper 4 is in the full-screen black display state; hence, the light rays L3 are absorbed by the display surface 41. As a result, the light rays are output from the first internal reflection face 3A of the light guide plate 3 only through the scattering regions 31. Specifically, the surface of the light guide plate 3 equivalently functions as the parallax barrier where the scattering regions 31 act as the openings (slit portions) and the total reflection regions 32 act as the light-shielding portions. This results in equivalent three-dimensional display in the parallax barrier type where the parallax barrier is disposed close to the back of the display section 1.

In contrast, for display in the two-dimensional display mode (FIG. 32B), the display section 1 displays images based on two-dimensional image data, and the display surface 41 of the electronic paper 4 is switched into the full-screen white display state (scattering-reflection mode). In this state, the first illumination light L1 from each first light source 2 is repeatedly internally total-reflected between the total reflection regions 32 of the first internal reflection face 3A and the second internal reflection face 3B in the light guide plate 3, thereby the first illumination light L1 is guided from the first side face, on which one of the first light sources 2 is disposed, to the opposite second side face, and output through the second side face. In addition, of light rays L2 which have entered the scattering regions 31 of the first internal reflection face 3A of the light guide plate 3, a part of light rays that does not satisfy the total reflection condition is output to the outside through the scattering regions 31. In addition, the scattering regions 31 internally reflect other partial light rays L3 that then enter the display surface 41 of the electronic paper 4 through the second internal reflection face 3B of the light guide plate 3. In this state, the display surface 41 of the electronic paper 4 is in the full-screen white display state; hence, the light rays L3 are scatter-reflected by the display surface 41. Such scatter-reflected light rays enter the light guide plate 3 again through the second internal reflection face 3B. An incident angle of such light rays does not satisfy the total reflection condition on the total reflection regions 32, and thus the light rays are output to the outside not only through the scattering regions 31 but also through the total reflection regions 32. As a result, the light rays are output through the entire surface of the first internal reflection face 3A of the light guide plate 3. Specifically, the light guide plate 3 functions as a planar light source similar to a typical backlight. This results in equivalent two-dimensional display in the backlight type where the typical backlight is disposed close to the back of the display section 1.

[Effect]

As described above, according to the display of the embodiment, the total reflection regions 32 and the scattering regions 31 are provided on the first internal reflection face 3A of the light guide plate 3. As a result, the light guide plate 3 itself equivalently functions as the parallax barrier. Consequently, the number of components is reduced compared with the display of the parallax barrier type in the past, leading to space-saving. In addition, the two-dimensional display mode and the three-dimensional display mode are easily switched from each other only through switching of the display state of the electronic paper 4.

5. Fourth Embodiment

A display according to a fourth embodiment of the disclosure is now described. It is to be noted that substantially the same components as those of the displays according to the first to third embodiments are designated by the same numerals, and description of them is appropriately omitted.

[Overall Configuration of Display]

FIGS. 33A and 33B illustrate an exemplary configuration of the display according to the fourth embodiment of the disclosure. The display is appropriately selectively switched between the two-dimensional display mode and the three-dimensional display mode, as in the display shown in FIGS. 32A and 32B. FIG. 33A illustrates a configuration in the three-dimensional display mode, and FIG. 33B illustrates a configuration in the two-dimensional display mode. FIGS. 33A and 33B each also schematically illustrate light rays output from light source devices in each display mode.

In the display, a light source device has a polymer diffuser plate 5 in place of the electronic paper 4 of the display shown in FIGS. 32A and 32B. Other configurations are the same as in the display shown in FIGS. 32A and 32B. The polymer diffuser plate 5 is formed of polymer-dispersed liquid crystal. The polymer diffuser plate 5 is disposed opposite to the light guide plate 3 close to the first internal reflection face 3A. The polymer diffuser plate 5 is an optical device that is allowed to selectively switch modes of action on incident light rays between a transparent mode and a diffusing-transmission mode.

[Basic Operation of Display]

In the display, for display in the three-dimensional display mode (FIG. 33A), a display section 1 displays images based on three-dimensional image data, and the polymer diffuser plate 5 is entirely switched into the transparent mode. In this state, first illumination light L1 from each first light source 2 is repeatedly internally total-reflected between total reflection regions 32 of the first internal reflection face 3A and a second internal reflection face 3B in the light guide plate 3, thereby the first illumination light L1 is guided from a first side face, on which one of the first light sources 2 is disposed, to an opposite second side face, and output through the second side face. In addition, in the light guide plate 3, of light rays L2 which have entered the scattering regions 31 of the first internal reflection face 3A, a part of light rays that does not satisfy the total reflection condition is output to the outside through the scattering regions 31. The light rays output to the outside through the scattering regions 31 enter the polymer diffuser plate 5. Here, the polymer diffuser plate 5 is entirely transparent; hence, the light rays directly enter the display section 1 through the polymer diffuser plate 5 at an angle equal to the output angle from the scattering regions 31. In addition, the scattering regions 31 internally reflect other partial light rays L3 that are then output to the outside through the second internal reflection face 3B of the light guide plate 3, and thus do not contribute to image display. As a result, light rays are output from the first internal reflection face 3A of the light guide plate 3 only through the scattering regions 31. Specifically, the surface of the light guide plate 3 equivalently functions as the parallax barrier where the scattering regions 31 act as the openings (slit portions) and the total reflection regions 32 act as the light-shielding portions. This results in equivalent three-dimensional display in the parallax barrier type where the parallax barrier is disposed close to the back of the display section 1.

In contrast, for display in the two-dimensional display mode (FIG. 33B), the display section 1 displays images based on two-dimensional image data, and the polymer diffuser plate 5 is entirely switched into the diffusing-transmission mode. In this state, the first illumination light L1 from each first light source 2 is repeatedly internally total-reflected between the total reflection regions 32 of the first internal reflection face 3A and the second internal reflection face 3B in the light guide plate 3, thereby the first illumination light L1 is guided from the first side face, on which one of the first light sources 2 is disposed, to the opposite second side face, and output through the second side face. In addition, in the light guide plate 3, of light rays L2 which have entered the scattering regions 31 of the first internal reflection face 3A, a part of light rays that does not satisfy the total reflection condition is output to the outside through the scattering regions 31. The light rays output to the outside through the scattering regions 31 enter the polymer diffuser plate 5. Here, the polymer diffuser plate 5 is entirely diffuse-transmissive; hence, the light rays incident on the display section 1 are diffused over the entire surface by the polymer diffuser plate 5. As a result, the light source device as a whole functions as a planar light source similar to a typical backlight. This results in equivalent two-dimensional display in the backlight type where the typical backlight is disposed close to the back of the display section 1.

6. Other Embodiments

The technology according to the present disclosure is not limited to the above-described embodiments, and various modifications or alterations of the technology may be made. For example, the embodiments have been described with the exemplary configuration where the scattering regions 31 and the total reflection regions 32 are provided on one of the first and second internal reflection faces 3A and 3B in the light guide plate 3, the scattering regions 31 and the total reflection regions 32 may be provided on both the first and second internal reflection faces 3A and 3B.

Any displays according to the above-described embodiments are allowed to be applied to, for example, a variety of electronic units having a display function. FIG. 36 illustrates an appearance configuration of a television apparatus as an example of such electronic units. The television apparatus has an image display screen section 200 including a front panel 210 and filter glass 220.

It is possible to achieve at least the following configurations from the above-described exemplary embodiments and the modifications of the disclosure.

(1) A display including:
  a display section including a plurality of pixels, and grouping the plurality of pixels into a plurality of pixel groups to assign, in a predetermined assignment pattern, a plurality of perspective images to the groups, respectively, thereby displaying the perspective images; and
  a light source device including a light guide plate and one or more first light sources, and emitting light for image display toward the display section, the light guide plate having a first internal reflection face and a second internal reflection face which face each other and having one or more side faces, and the first light sources applying first illumination light through the side face of the light guide plate into the light guide plate,
  wherein one or both of the first and second internal reflection faces each have a plurality of scattering regions arranged in a predetermined arrangement pattern corresponding to the predetermined assignment pattern, the scattering regions allowing the first illumination light from the first light source to be scattered and to exit to the outside of the light guide plate through the first internal reflection face.

(2) The display according to (1), wherein each of the scattering regions has a width and includes a scattering portion with a height, the height having a predetermined relationship with the width of the scattering region.

(3) The display according to (2), wherein following relationship is satisfied:

$$0 < H1 < 2*D1,$$

where H1 is the height of the scattering portion, and D1 is the width of the scattering region.

(4) The display according to any one of (1) to (3), wherein the scattering regions are configured of an arrangement of light scattering members of a material different from a material of the light guide plate.

(5) The display according to (4), wherein the light scattering members are disposed on a surface, corresponding to the first internal reflection face or the second internal reflection face, of the light guide plate.

(6) The display according to any one of (1) to (5), wherein a width of each of the scattering regions has a predetermined relationship with a width of a single pixel, the single pixel being assigned to any one of the perspective images to display the assigned perspective image.

(7) The display according to (6), wherein the width of each of the scattering regions is from 0.2 times to 1.5 times as large as the width of a single pixel assigned to any one of the perspective images to display the assigned perspective image.

(8) The display according to any one of (1) to (7), wherein the first light sources are disposed to face the respective side faces of the light guide plate, and the plurality of scattering regions are configured to vary in form depending on a distance from a corresponding one of the side faces of the light guide plate.

(9) The display according to any one of (1) to (7), wherein each of the plurality of scattering regions has a plurality of scattering portions each allowing the first illumination light to be scattered.

(10) The display according to any one of (1) to (9), further including a second light source disposed to face a surface, of the light guide plate, corresponding to the second internal reflection face, the second light source externally applying second illumination light to the second internal reflection face.

(11) The display according to (10), wherein
the display section is configured to selectively switch images to be displayed between the plurality of perspective images based on three-dimensional image data and an image based on two-dimensional image data, and
the second light source is controlled to be unlit during display of the plurality of perspective images on the display section, and controlled to be lit during display of the image based on the two-dimensional image data on the display section.

(12) The display according to (11), wherein the first light source is controlled to be lit during display of the plurality of perspective images on the display section, and controlled to be unlit or lit during display of the images based on the two-dimensional image data on the display section.

(13) The display according to any one of (1) to (9), further including an optical device disposed to face a surface, of the light guide plate, corresponding to the second internal reflection face, and allowed to selectively switch modes of action on incident light rays between a light absorption mode and a scattering-reflection mode.

(14) The display according to any one of (1) to (9), further including an optical device disposed to face surface, of the light guide plate, corresponding to the first internal reflection face, and allowed to selectively switch modes of action on incident light rays between a transparent mode and a diffusing-transmission mode.

(15) A display including:
a display section including a plurality of pixels; and
a light source device including a light guide plate and a light source, and emitting light to the display section,
wherein the display section groups the plurality of pixels into a plurality of pixel groups and assigns, in a predetermined assignment pattern, a plurality of perspective images to the groups, respectively, thereby to display the perspective images, and
the light guide plate has a plurality of scattering regions arranged in a predetermined arrangement pattern corresponding to the predetermined assignment pattern, the scattering regions allowing the light from the light source to be scattered and to exit to the outside of the light guide plate.

(16) An electronic unit including a display, the display including:
a display section including a plurality of pixels, and grouping the plurality of pixels into a plurality of pixel groups to assign, in a predetermined assignment pattern, a plurality of perspective images to the groups, respectively, thereby displaying the perspective images; and
a light source device including a light guide plate and one or more first light sources, and emitting light for image display toward the display section, the light guide plate having a first internal reflection face and a second internal reflection face which face each other and having one or more side faces, and the first light sources applying first illumination light through the side face of the light guide plate into the light guide plate,
wherein one or both of the first and second internal reflection faces each have a plurality of scattering regions arranged in a predetermined arrangement pattern corresponding to the predetermined assignment pattern, the scattering regions allowing the first illumination light from the first light source to be scattered and to exit to the outside of the light guide plate through the first internal reflection face.

The present disclosure contains subject matter related to that disclosed in Japanese Priority Patent Application JP 2011-101947 filed in the Japan Patent Office on Apr. 28, 2011, and Japanese Priority Patent Application JP 2011-214868 filed in the Japan Patent Office on Sep. 29, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display comprising:
a display section including a plurality of pixels, and grouping the plurality of pixels into a plurality of pixel groups to assign, in a predetermined assignment pattern, a plurality of perspective images to the groups, respectively, thereby displaying the perspective images; and
a light source device including a light guide plate and at least one light source, and emitting light for image display toward the display section, the light guide plate having a first internal reflection face and a second internal reflection face which face each other and having one or more side faces, and at least one light source applying first illumination light through the side face of the light guide plate into the light guide plate,
wherein one or both of the first and second internal reflection faces each have a plurality of scattering regions arranged in a predetermined arrangement pattern corresponding to the predetermined assignment pattern, the scattering regions allowing the first illumination light from at least one light source to be scattered and to exit to the outside of the light guide plate through the first internal reflection face,
wherein, a width of each of the scattering regions has a predetermined relationship with a width of a single pixel, the single pixel being assigned to any one of the perspective images to display the assigned perspective image; and
wherein, the width of each of the scattering regions is from 0.2 times to 1.5 times as large as the width of a single pixel assigned to any one of the perspective images to display the assigned perspective image.

2. The display according to claim 1, wherein each of the scattering regions has a width and includes a scattering portion with a height, the height having a predetermined relationship with the width of the scattering region.

3. The display according to claim 2, wherein following relationship is satisfied:

$$0 < H1 < 2*D1,$$

where H1 is the height of the scattering portion, and D1 is the width of the scattering region.

4. The display according to claim 1, wherein the scattering regions are configured of an arrangement of light scattering members of a material different from a material of the light guide plate.

5. The display according to claim 4, wherein the light scattering members are disposed on a surface, corresponding to the first internal reflection face or the second internal reflection face, of the light guide plate.

6. The display according to claim 1, wherein at least one light source is disposed to face the respective side faces of the light guide plate, and
the plurality of scattering regions are configured to vary in form depending on a distance from a corresponding one of the side faces of the light guide plate.

7. The display according to claim 1, wherein each of the plurality of scattering regions has a plurality of scattering portions each allowing the first illumination light to be scattered.

8. The display according to claim 1, further comprising an optical device disposed to face a surface of the light guide plate corresponding to the second internal reflection face, and allowed to selectively switch modes of action on incident light rays between a light absorption mode and a scattering-reflection mode.

9. The display according to claim 1, further comprising an optical device disposed to face a surface of the light guide plate corresponding to the first internal reflection face, and allowed to selectively switch modes of action on incident light rays between a transparent mode and a diffusing-transmission mode.

\* \* \* \* \*